United States Patent
Howe et al.

(10) Patent No.: US 10,824,492 B2
(45) Date of Patent: Nov. 3, 2020

(54) SYSTEMS AND METHODS FOR FACILITATING TRULY RANDOM BIT GENERATION

(71) Applicant: The Boeing Company, Chicago, IL (US)

(72) Inventors: Wayne R. Howe, Irvine, CA (US); Jeffrey H. Hunt, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 225 days.

(21) Appl. No.: 15/714,937

(22) Filed: Sep. 25, 2017

(65) Prior Publication Data
US 2019/0095269 A1    Mar. 28, 2019

(51) Int. Cl.
| | | |
|---|---|---|
| G06F 21/00 | (2013.01) | |
| G06F 11/07 | (2006.01) | |
| H01L 27/108 | (2006.01) | |
| G06F 11/10 | (2006.01) | |
| H04L 9/34 | (2006.01) | |
| G06F 7/58 | (2006.01) | |

(52) U.S. Cl.
CPC .......... *G06F 11/0763* (2013.01); *G06F 7/588* (2013.01); *G06F 11/102* (2013.01); *H01L 27/10811* (2013.01); *H04L 9/34* (2013.01)

(58) Field of Classification Search
CPC .... G06F 11/0763; G06F 7/588; G06F 11/102; H01L 27/10811; H04L 9/34
See application file for complete search history.

(56) References Cited

U.S. PATENT DOCUMENTS

| | | |
|---|---|---|
| 5,727,062 A | 3/1998 | Ritter |
| 7,881,473 B2 | 2/2011 | Wang et al. |
| 9,509,507 B1 | 11/2016 | Hunt et al. |
| 2002/0094081 A1 | 7/2002 | Medvinsky |

(Continued)

FOREIGN PATENT DOCUMENTS

| | | |
|---|---|---|
| EP | 2434683 | 3/2012 |
| WO | WO 02/047356 | 6/2002 |

(Continued)

OTHER PUBLICATIONS

"World's Fastest Quantum Random Number Generator Unveiled in China", MIT Technology Review, Jun. 11, 2015, pp. 1-5 [online], [retrieved on Nov. 15, 2017]. Retrieved from the Internet: <URL: https://www.technologyreview.com/s/538406/worlds-fastest-quantum-random-number-generator-unveiled-in-china/>.

(Continued)

*Primary Examiner* — Tri M Tran
(74) *Attorney, Agent, or Firm* — Haynes and Boone, LLP

(57) ABSTRACT

Various techniques provide systems and methods for facilitating truly random bit generation. In one example, a method includes receiving a first truly random bit stream in a first memory that includes a plurality of memory cells. Each of the plurality of memory cells stores a respective one bit of the first truly random bit stream. The method further includes generating, by a logic circuit, each bit of a second truly random bit stream based on a respective pair of bits of the first truly random bit stream. The method further includes storing the second truly random bit stream in a second memory. Related methods and devices are also provided.

20 Claims, 18 Drawing Sheets

(56) References Cited

U.S. PATENT DOCUMENTS

| | | | |
|---|---|---|---|
| 2002/0176578 A1 | 11/2002 | LaPat et al. | |
| 2002/0191796 A1 | 12/2002 | Muschenborn | |
| 2003/0068039 A1 | 4/2003 | Lee | |
| 2003/0149869 A1 | 8/2003 | Gleichauf | |
| 2004/0205095 A1* | 10/2004 | Gressel | G06F 7/582 708/253 |
| 2005/0055391 A1 | 3/2005 | Carlson et al. | |
| 2006/0013199 A1 | 1/2006 | Boora | |
| 2006/0040731 A1 | 2/2006 | Yamamoto et al. | |
| 2006/0072748 A1 | 4/2006 | Buer | |
| 2006/0193472 A1 | 8/2006 | Yuen | |
| 2008/0304669 A1 | 12/2008 | Bugbee | |
| 2009/0013019 A1* | 1/2009 | Tapster | G06F 7/588 708/250 |
| 2009/0279697 A1 | 11/2009 | Schneider | |
| 2010/0150344 A1 | 6/2010 | Karroumi et al. | |
| 2010/0169660 A1 | 7/2010 | Voss et al. | |
| 2011/0096923 A1 | 4/2011 | Rollgen | |
| 2011/0138192 A1 | 6/2011 | Kocher et al. | |
| 2011/0246792 A1 | 10/2011 | Weingarten | |
| 2013/0073598 A1* | 3/2013 | Jacobson | G06F 7/588 708/252 |
| 2016/0028696 A1 | 1/2016 | Howe | |
| 2016/0065368 A1 | 3/2016 | Hars | |
| 2016/0219024 A1 | 7/2016 | Verzun et al. | |
| 2017/0163414 A1 | 6/2017 | Moon | |

FOREIGN PATENT DOCUMENTS

| | | |
|---|---|---|
| WO | WO 2007/109373 | 9/2007 |
| WO | WO 2009/136848 | 11/2009 |

OTHER PUBLICATIONS

Rubin, Jason M., "Can a Computer Generate a Truly Random Number?", MIT School of Engineering, Nov. 1, 2011, pp. 1-2 [online], [retrieved on Nov. 15, 2017]. Retrieved from the Internet: ,URL: https://engineering.mit.edu/engage/ask-an-engineer/can-a-computer-generate-a-truly-random-number/>.

Lilly, Paul, "This Self-Destructing PC is like the Fort Knox of Computers", PC Gamer, Jul. 6, 2017, pp. 1-6 [online], [retrieved on Nov. 15, 2017]. Retrieved from the Internet: <URL: http://www.pcgamer.com/this-self-destructing-pc-is-like-the-fort-knox-of-computers/>.

Microsemi, Clock Skew and Short Paths Timing, 2014, Microsemi Corporation, Application Note AC198, pp. 1-13 (Year: 2014).

Richard Soja, Automotive Security: From Standards to Implementation, Jan. 2014, Freescale Semiconductor, Inc., Autosecuritywp Rev 1, pp. 1-10 (Year: 2014).

A. J. Menezes et al. Handbook of Applied Cryptography. CRC Press, 2001. Chapters 5 & 7. (Year: 2001).

Federal Information Processing Standards Publication 197. Advanced Encryption Standard (AES). Nov. 27, 2001. (Year: 2001).

European Search Opinion for EP 18 174 169. dated Jan. 25, 2019 (Year: 2019).

Unknown Author, AES Cipher Modes with EFM32, 2013, Silicon Labs, pp. 1-20 Retrieved from https ://www.silabs.com/documents/public/application-notes/AN0033.pdf (Year: 2013).

* cited by examiner

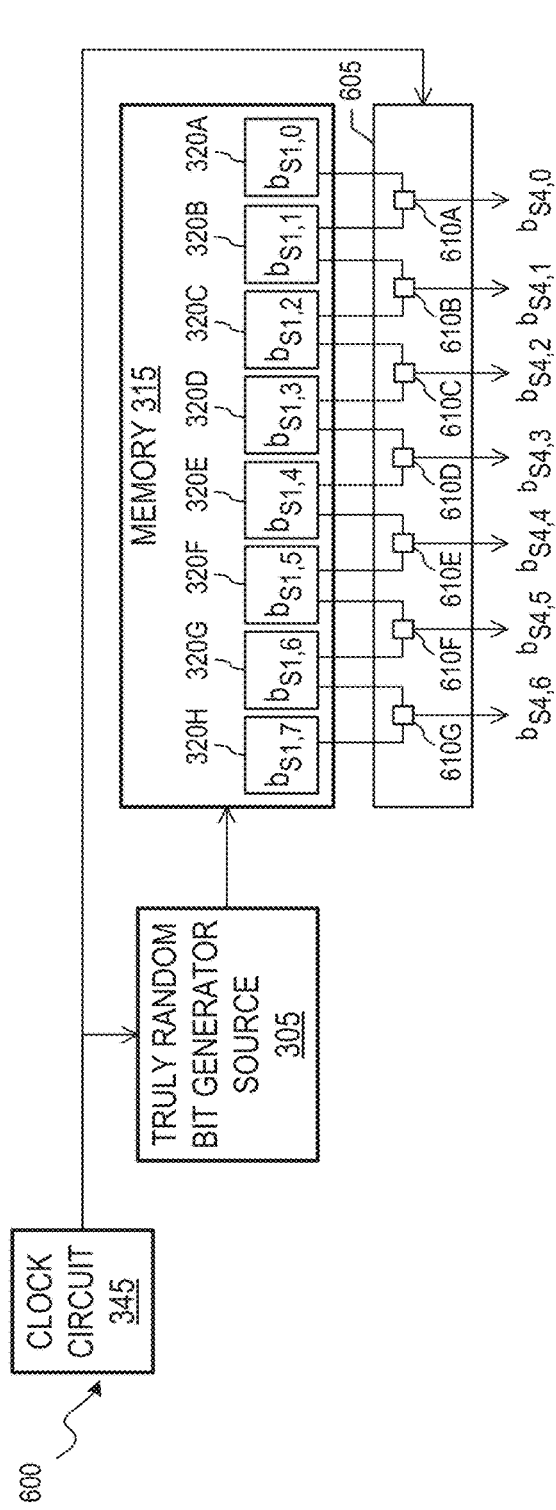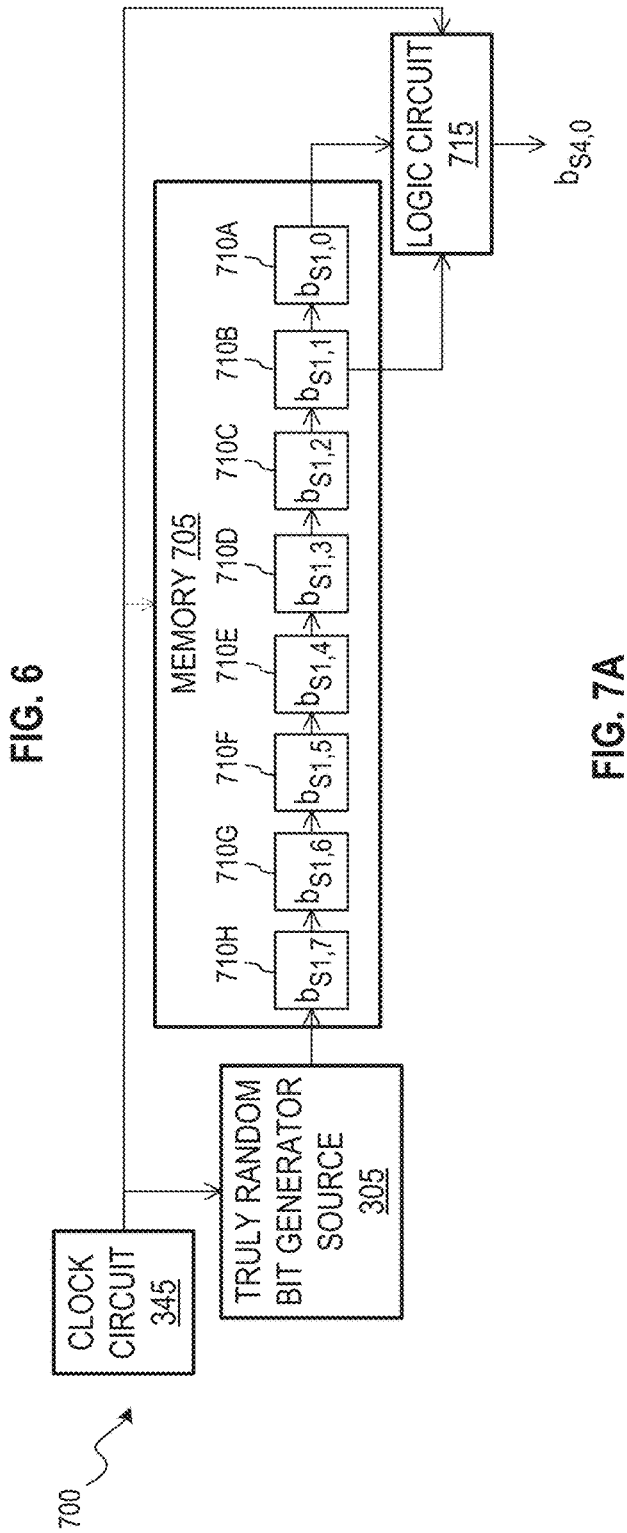

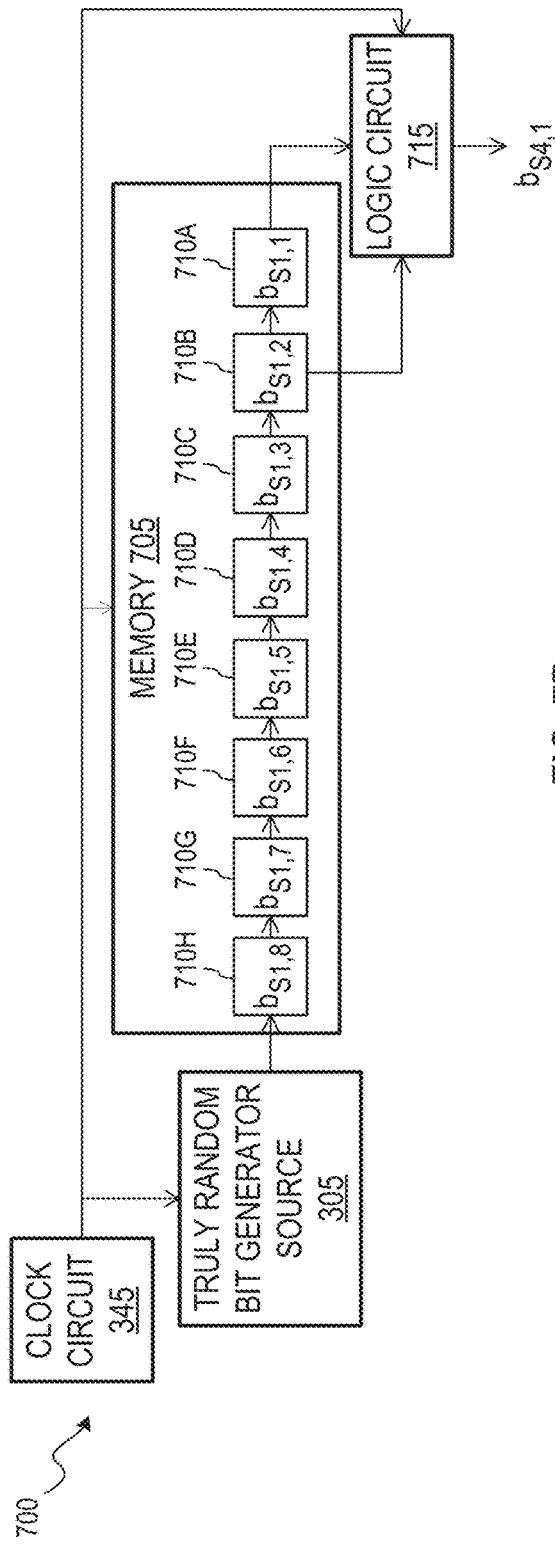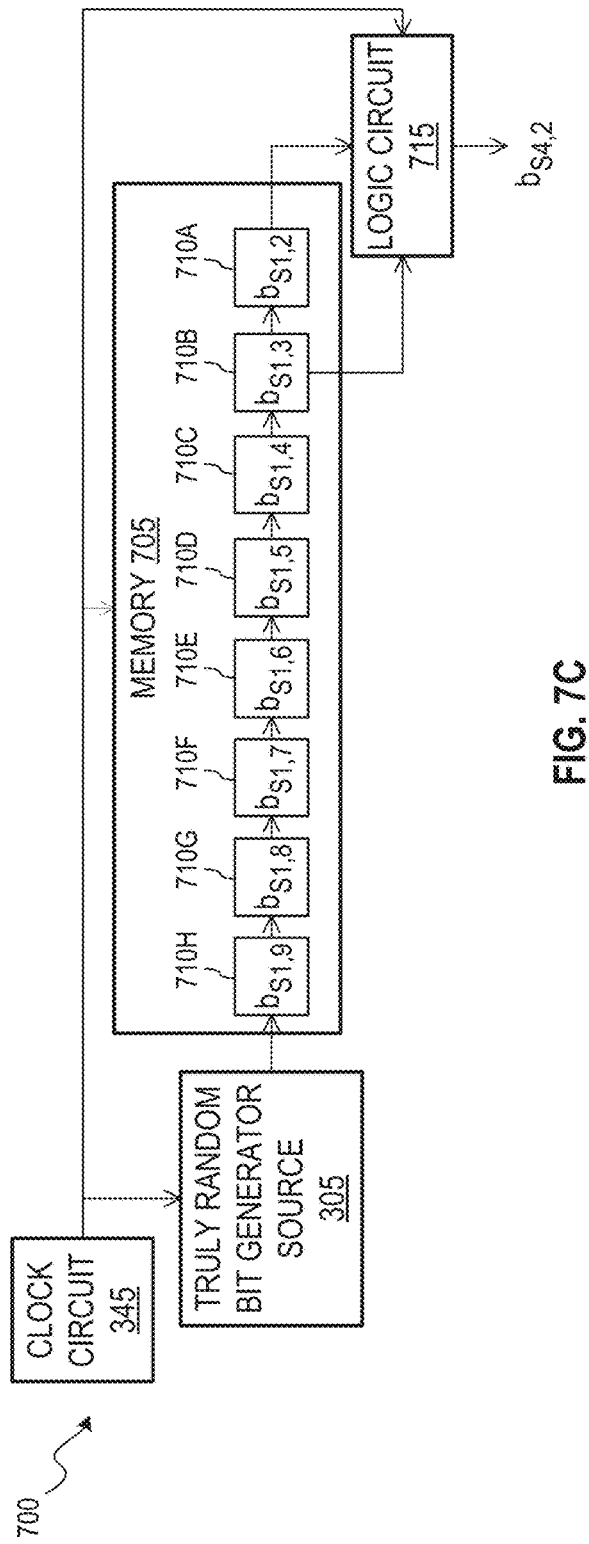

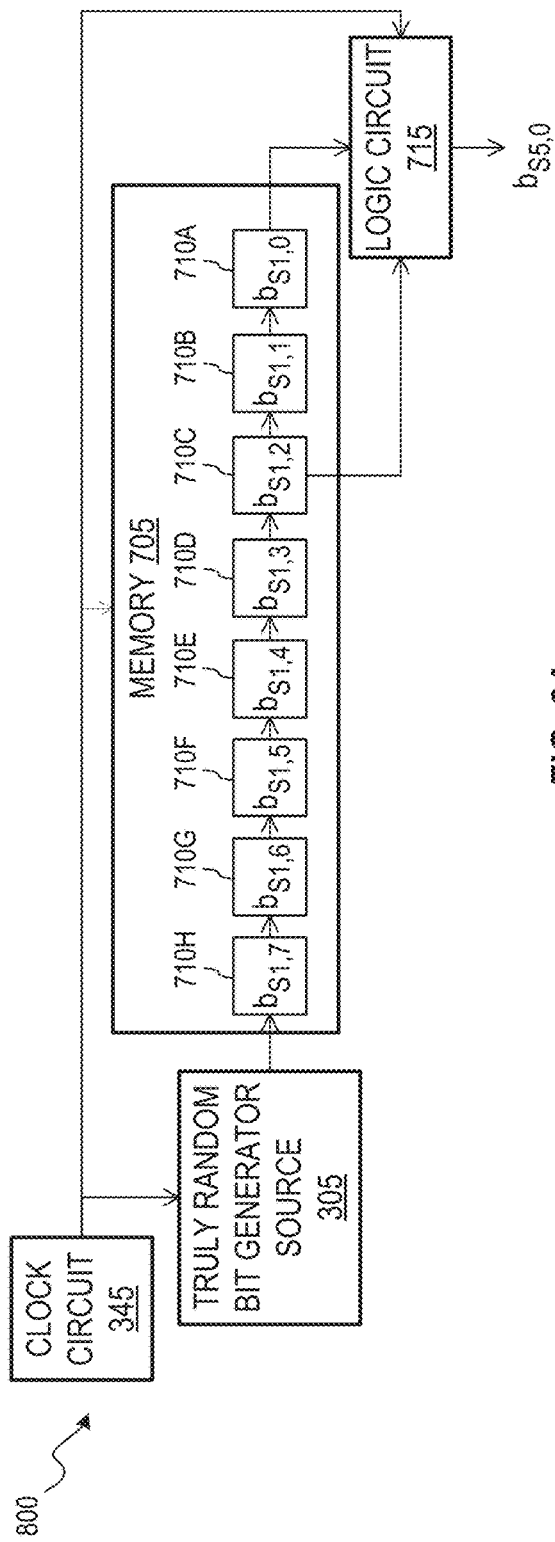
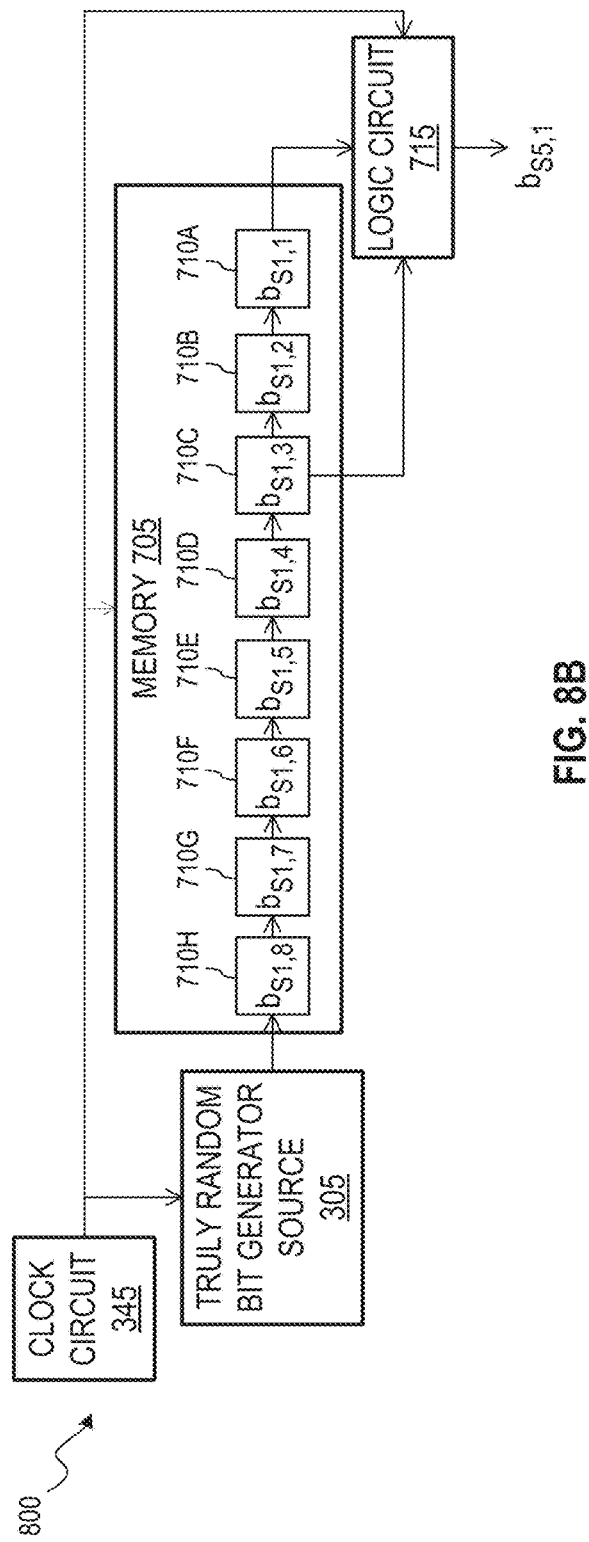
FIG. 8A
FIG. 8B

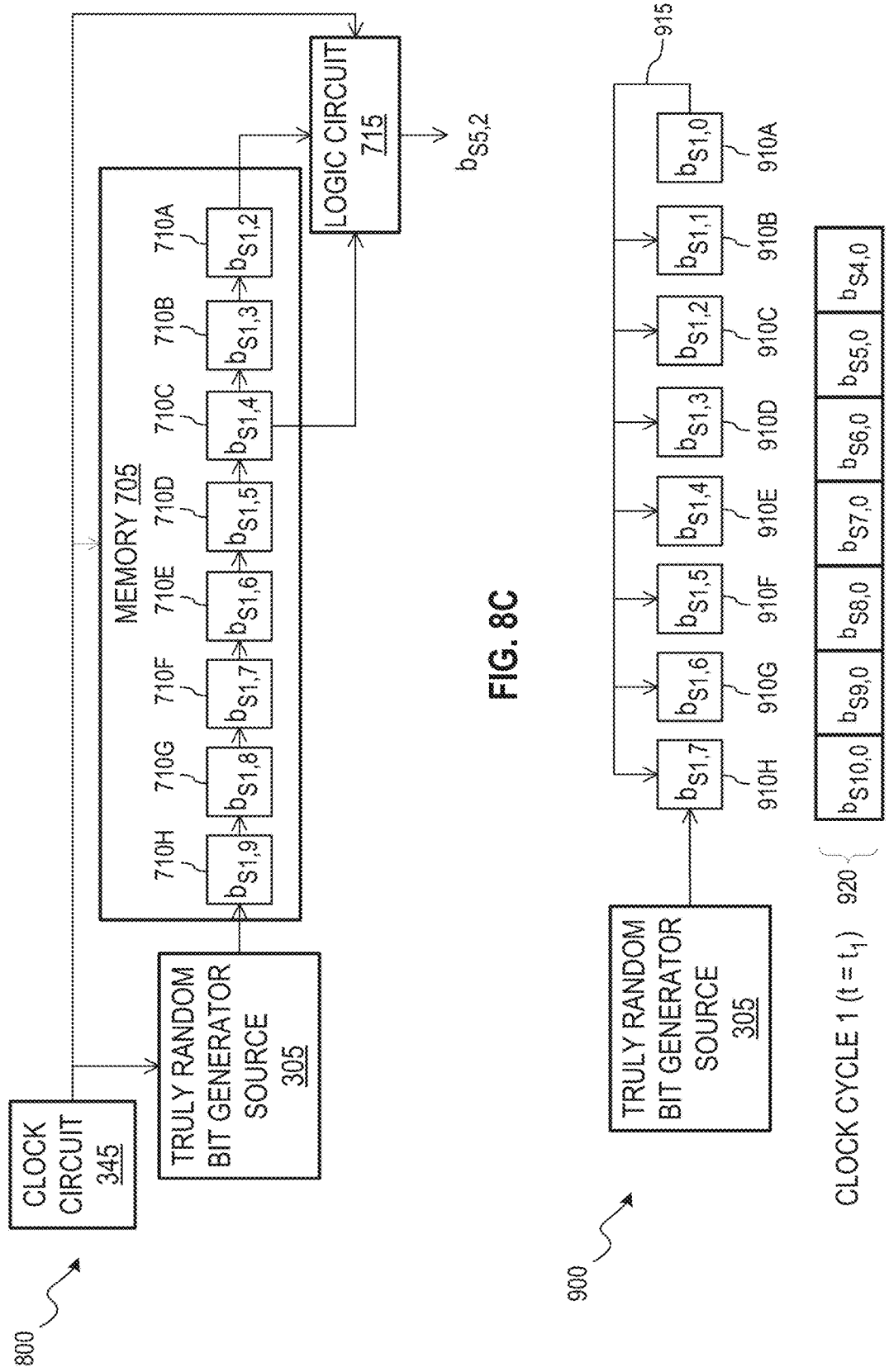

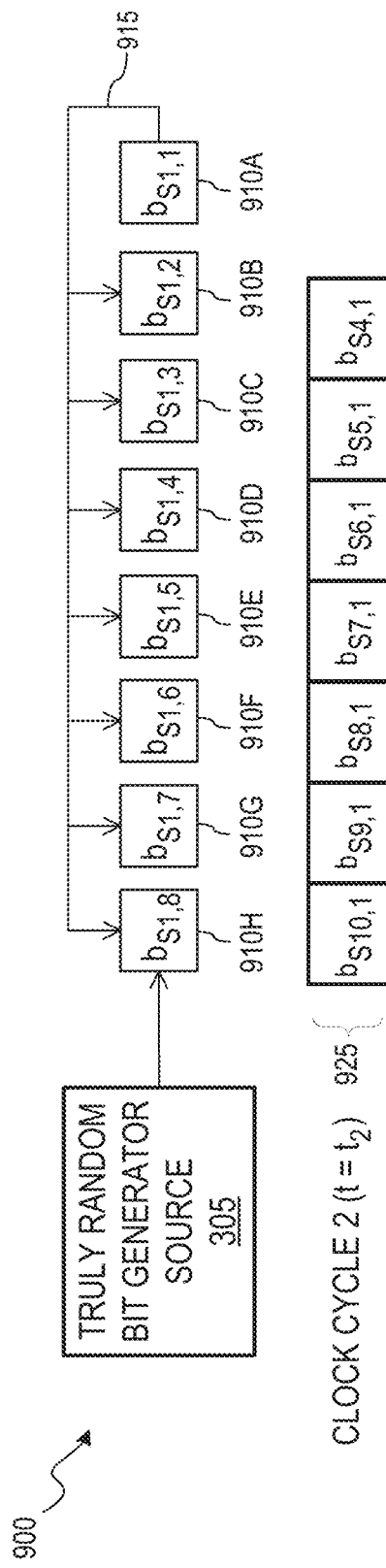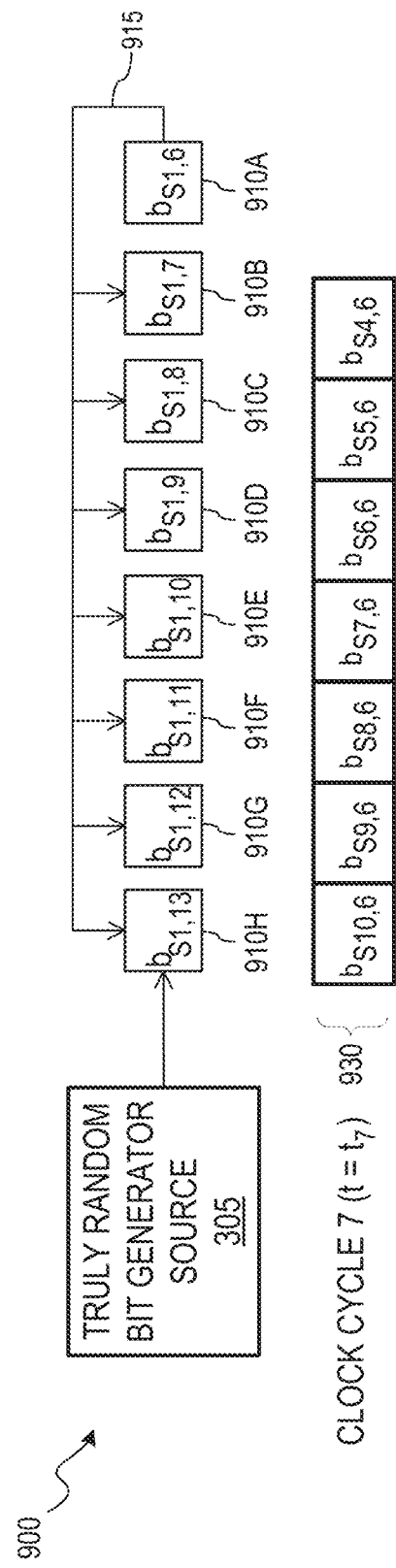

US 10,824,492 B2

SYSTEMS AND METHODS FOR FACILITATING TRULY RANDOM BIT GENERATION

BACKGROUND

Technical Field

The present application generally relates to secure data transfers and, more specifically, to systems and methods for facilitating truly random bit generation.

Related Art

Providing secure transfers of data over intranetworks and internetworks, such as the Internet, has become increasingly important. Secure data transfers may be supported through the encryption and decryption of data transmitted over the networks. Data that is encrypted using a strong encryption key may prevent an attacker from decrypting the encrypted data, such as through brute force methods.

SUMMARY

In accordance with various embodiments further discussed herein, truly random bits (e.g., also referred to as true random bits, absolutely random bits, or absolutely truly random bits) and truly random bit streams (e.g., also referred to as true random bit streams, absolutely random bit streams, or absolutely truly random bit streams) may be generated at a desired rate, such as in the gigahertz range. Truly random bit streams may be generated by one or more truly random bit generator sources. In an aspect, the truly random bit generator source may be, may include, or may be a part of, a truly random bit generator circuit. Additional truly random bit streams may be generated by intermixing bits of one truly random bit stream generated by a truly random bit generator source with itself and/or with bits of another truly random bit stream generated by a second truly random bit generator source. In some cases, these additional truly random bit streams may then be intermixed with themselves and/or with other previously generated truly random bit streams to generate further additional truly random bit streams. As such, using various embodiments, a high rate of truly random bit generation may be effectuated through generation by the truly random bit generator source(s) and intermixing of one or more generated truly random bit streams. In an embodiment, the truly random bit streams may be used as, or used to derive, key material (e.g., encryption key, decryption key). In an aspect, the random bit streams may be true random bit streams. In some cases, the true random bit streams may be based on measurement of quantum processes, or other physical or natural phenomenon or sources of natural entropy. These sources or true randomness extraction from these sources may provide true random bit generation, but may be rate-limited or slower in speed than desired for uses such as cryptography. In an embodiment, the truly random bit streams may be scaled up to produce very high volumes of truly random bits or very high bit rates of truly random bits to meet the demand for high volume and/or high speed truly random bits, such as for facilitating secure transmission of large amounts of data over the Internet for example.

According to an embodiment, a method may include receiving in a first memory a first truly random bit stream either of a predetermined length or as a continuous bit stream. The method may further include receiving in a second memory a second truly random bit stream. The method may further include generating, by a logic circuit, a third truly random bit stream by performing bitwise operations to combine each bit of the first truly random bit stream with a corresponding bit of the second truly random bit stream. The method may further include storing the third truly random bit stream in a third memory.

According to another embodiment, a method may include receiving a first truly random bit stream either of a predetermined length or as a continuous bit stream in a first memory comprising a plurality of memory cells. Each of the plurality of memory cells stores a respective one bit of the first truly random bit stream. The method may further include generating, by a logic circuit, each bit of a second truly random bit stream based on a respective pair of bits of the first truly random bit stream. The method may further include storing the second truly random bit stream in a second memory.

According to another embodiment, a device may include a memory. The memory may include comprising a plurality of memory cells, where each of the plurality of memory cells is configured to store a respective one bit of a first truly random bit stream. The device may further include a logic circuit configured to generate each bit of a second truly random bit stream based on a respective pair of bits of the first truly random bit stream.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5 and 6 illustrate a block diagram of systems for generating a truly random bit stream in accordance with one or more embodiments of the present disclosure.

FIGS. 7A through 7C, 8A through 8C, and 9A through 9C illustrate block diagrams of systems for generating a truly random bit over sequential clock cycles in accordance with one or more embodiments of the present disclosure.

Figure 1:
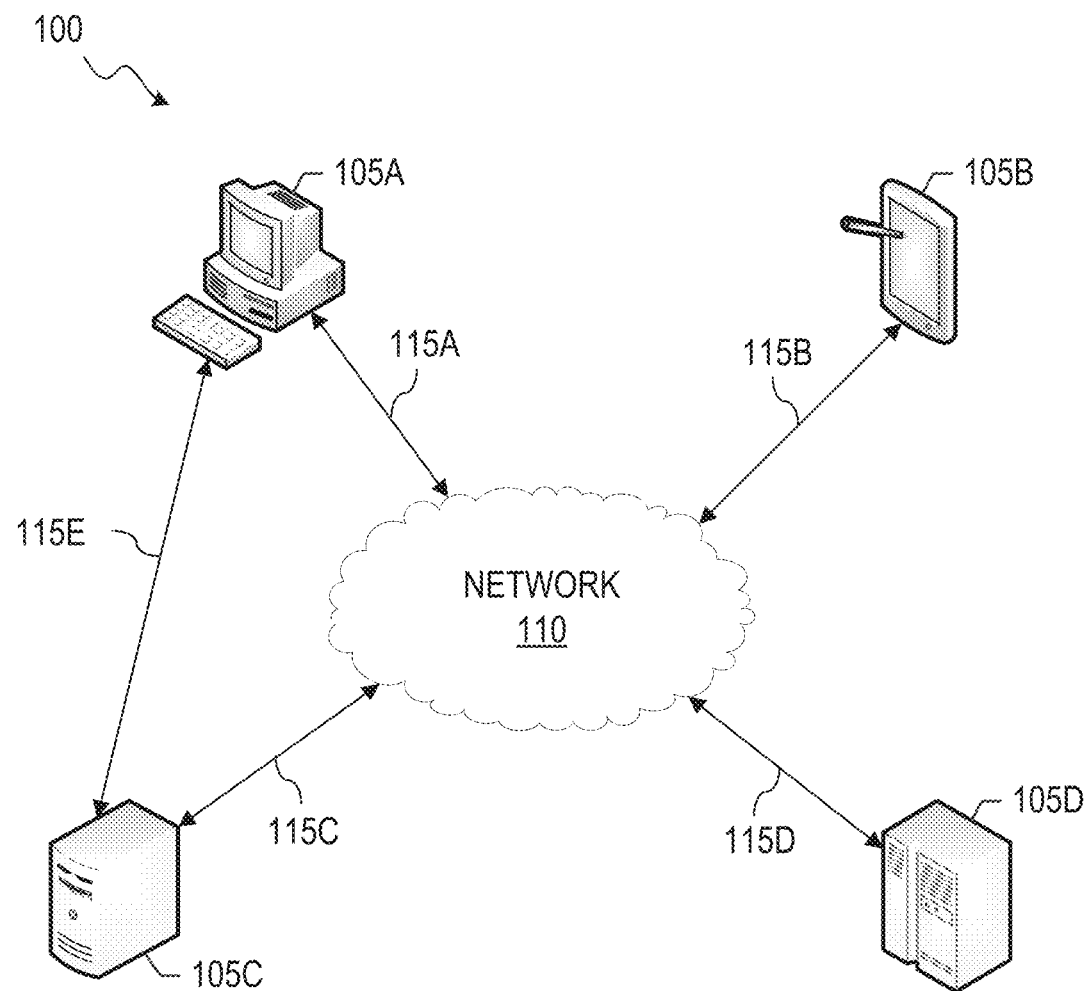
FIG. 1 illustrates an example network environment in which data encryption/decryption and data communication may be implemented in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate secure communication between devices, with or without one or more intervening networks. Such techniques may include data encryption/decryption and data communication (e.g., transmission, reception) and may facilitate protection of data on the move as well as data at rest. In some embodiments, the techniques may include facilitating generation of truly random bits at desired bit rates, such as for use as key material (e.g., encryption keys, decryption keys) or for use in deriving key material; generating key material based on previously generated key material and/or associated data (e.g., encrypted data, non-encrypted data); and/or erasing of key material and/or associated data upon use of the key material.

In some embodiments, such techniques may be utilized to generate a sufficient amount of key material to accommodate secure communication (e.g., transmitting, receiving) of a large amount of information between devices directly and/or between devices over one or more networks. For example, key material may be utilized to encrypt traffic transmitted over the Internet and decrypt the encrypted traffic received over the Internet. In an aspect, the key material may include an encryption key for use in encrypting plaintext data at the encryption side and a decryption key for use in decrypting encrypted data at the decryption side.

A computing device may be referred to as an encryption computing device, encryption device, or encryptor when used as a transmitter that encrypts data and transmits the encrypted data (e.g., to another computing device). Similarly, a computing device may be referred to as a decryption computing device, decryption device, or decryptor when used as a receiver that receives (e.g., from another computing device) encrypted data and decrypts the received encrypted data, such as for consumption by a user. For example, the data transmitted by the encryptor to the decryptor may be web content. In some cases, a computing device may operate as an encryptor for some communications and a decryptor in other communications. In other cases, a computing device may be a dedicated encryptor or a dedicated decryptor.

In one or more embodiments, truly random bits (e.g., also referred to as true random bits, absolutely random bits, or absolutely truly random bits) and truly random bit streams (e.g., also referred to as true random bit streams, absolutely random bit streams, or absolutely truly random bit streams) may be generated at a desired rate. As an example, the desired bit rates may range from the megahertz range to the terahertz range. The truly random bit streams may be utilized as key material (e.g., encryption key, decryption key) or utilized to derive key material. For a given key, a length (e.g., number of bits or bytes) of the key may be specified based on a desired security level, which may be set (e.g., mandated) by a user, an application, an owner of a server, a government authority, and/or other entity. Longer key material is generally associated with higher security, since properly generated key material is more difficult for an attacker to crack through brute force methods and/or other methods. In an aspect, the key may be 8 bits, 128 bits, 256 bits, or 512 bits, although the key may include any number of bits less than, more than, or between these example lengths. In some aspects, the key material is generally any sequence of bits that need not be, or need not be based on, truly random bit streams.

In an embodiment, the truly random bits may be generated using a truly random bit generator source. In an aspect, the truly random bit generator source may be, may include, or may be a part of, a truly random bit generator circuit. Although various embodiments of the present disclosure utilize one or more unbiased truly random bit generators that generate a bit value of 1 and a bit value of 0 with equal probability (or substantially equal probability), the various embodiments may also be implemented in cases that one or more biased random bit generators are utilized for random bit generation.

In an aspect, a truly random bit generator may generate truly random bits based on a measurement of a physical process expected to be random, such as atmospheric noise, thermal noise, quantum process, or other physical or natural process or sources of natural entropy. These sources or true randomness extraction from these sources may provide true random bit generation, but may be rate-limited or slower in speed than desired for uses such as cryptography. In an embodiment, the truly random bit streams may be scaled up to produce very high volumes of truly random bits or very high bit rates of truly random bits to meet the demand for high volume and/or high speed truly random bits, such as for facilitating secure transmission of large amounts of data over the Internet for example.

A truly random bit generator source may also be referred to as a true random bit generator source or absolutely random bit generator source. Based on the measured values, each measurement of the physical process may be associated with a 1 or a 0. A truly random bit generated by a true, unbiased random bit generator has an absolute 50% probability of being a 1 and an absolute 50% probability of being a 0. Such a random bit may be referred to as a true and unbiased random bit or simply a true random bit or an absolutely random bit. In an aspect, a first true random bit may be combined with a second true random bit (e.g., on a bit-by-bit basis) to generate a third true random bit. A bitwise operation having logical equality may be utilized, in which the bitwise operation provides a functional value of true (e.g., 1) when both functional arguments have the same logical value and false (e.g., 0) when the functional arguments are different. For example, an exclusive-or operation (exclusive disjunction operation or XOR operation) or an exclusive-nor operation (XNOR operation), may be utilized as the bitwise operation, although other operations may be utilized. In an aspect, a random bit stream or a true random bit stream may be used as, or used to derive, key material (e.g., encryption keys).

In some cases, the physical process may be a quantum process (e.g., quantum mechanical in nature). As an example, lasers may be used to generate quantum mechanically coupled photon states. The nature of this coupling allows the photons to simultaneously exist in orthogonal modes. These orthogonal modes are typically manifested in optical polarization, with orthogonal modes being vertical and horizontal linear or left and right circular for example. The random nature of the quantum mechanical processes will randomly, with equal probability, cause measurement of one orthogonal state or the other. With an assignment of bit value 0 or 1 to one polarization state measurement, a true random bit stream may be generated. In this case, the true random bit stream may be referred to as a quantum bit stream that includes quantum bits or qubits, and the key material may include, and may be referred to as, quantum keys.

In some embodiments, a random bit stream may be generated based on one or more previously generated random bit streams. In some cases, a truly random bit stream may be generated based on one or more previously generated truly random bit streams. In an aspect, a truly random bit stream may be generated based on one or more truly random bit streams generated by one or more truly random bit generator sources. In an aspect, additional truly random bit streams may be generated by intermixing bits of one truly random bit stream with itself and/or with bits of another truly random bit stream. For example, to supplement truly random bit generation by a truly random bit generator source, one or more additional truly random bit streams may be generated by intermixing bits of a truly random bit stream generated by the truly random bit generator source with itself and/or with other previously generated truly random bit streams. In this example, these additional truly random bit streams may then be intermixed with themselves and/or with other previously generated truly random bit streams to generate further additional truly random bit streams.

As such, using various embodiments, the rate of truly random bit generation may be increased relative to a case in which one or more truly random bit generator sources are generating all the truly random bits, such as scaling up by a factor of 2, 3, 10, 100, etc. dependent at least on the amount of intermixing performed on previously generated truly random bit streams to generate additional truly random bit streams. For example, when a truly random bit generator source is generating truly random bits at 1 Gbps and the intermixing of truly random bit streams increases the rate of truly random bit generation by a factor of 100, the effective rate at which truly random bits are generated is 100 Gbps. The rate of truly random bit generation may be based on a desired security level to be supported by such truly random bit generation, since the desired security level may indicate the length of key material (e.g., number of truly random bits in an encryption key), and/or amount and/or type of data that requires encryption.

In one or more embodiments, plaintext data may be encrypted and encrypted data may be decrypted using key material (e.g., encrypted using encryption key and decrypted using decryption key). In some aspects, the key material may be, or may be derived based on, the truly random bit streams generated by the truly random bit generator source(s) and/or derived from one or more truly random bit streams generated by the truly random bit generator source(s). In this regard, on the encryption side, the truly random bit streams may be used as, or may be derived into, encryption keys to be utilized for encryption. In some aspects, the key material is generally any sequence of bits that need not be, or need not be based on, truly random bit streams.

In an embodiment, an encryptor may receive plaintext data (e.g., user data) to be encrypted. The encryptor may divide (e.g., fragment, partition) the plaintext data into one or more data portions, such as to facilitate encryption of the plaintext data and/or transmission of the encrypted data. A length (e.g., number of bits or bytes) of each data portion of the plaintext data may be the same or different. In some cases, the length of the data portion may be based on the length of the encryption key to be used to encrypt the data portion. For example, the length of the encryption key may be the same, or longer, than the data portion. In this regard, the length of the encryption key may be based on a desired security level, which may be by a user, an application, an owner of a server, a government authority, and/or other entity.

The encryptor may encrypt a first data portion of the plaintext data using a first encryption key to provide a first encrypted data portion. The encryptor may generate a second encryption key for encryption of a second data portion of the plaintext data based on the first encryption key. In some cases, the second encryption key may also be based on the first data portion and/or the first encrypted data portion. For example, the second encryption key may be based on bitwise operations (e.g., XOR, XNOR, AND, OR, and/or other operations) performed on the first encryption key and at least one of the first data portion or the first encrypted data portion. The encryptor may iteratively encrypt a current data portion using a current encryption key, generate a next encryption key to be used in encrypting a next data portion, and switch to using the next encryption key for encrypting the next data portion. In this regard, at an $n^{th}$ iteration, the encryptor may generate an $n^{th}$ encryption key to encrypt an $n^{th}$ data portion based at least on an $(n-1)^{th}$ encryption key previously generated and used to encrypt an $(n-1)^{th}$ data portion. The $n^{th}$ encryption key may also be based on the $(n-1)^{th}$ data portion and/or the $(n-1)^{th}$ encrypted data portion.

In an aspect, the first encryption key may be, or may be based on, a truly random bit stream received by the encryptor. The truly random bit stream may be generated by the truly random bit generator(s) (e.g., based on quantum mechanical processes) or generated by intermixing truly random bit streams. To encrypt remaining portions of the plaintext data, the encryptor may then derive subsequent encryption keys (e.g., without receiving truly random bit streams from a truly random bit generator(s)).

The encryptor may transmit the encrypted data portions and information associated with the first encryption key and any subsequent encryption keys to a decryptor. The information may be indicative of the first encryption key utilized by the encryptor and bitwise operations performed in each iteration of the encryption process to generate subsequent encryption keys, and/or information that allows the decryptor to generate a corresponding first decryption key and subsequent decryption keys. In an aspect, such information may be provided as part of a key exchange (e.g., quantum key exchange) between the encryptor and the decryptor.

In some cases, the encryptor may transmit a data packet that includes one or more encrypted data portions (e.g., as a payload of the data packet). The data packet may identify (e.g., in its header) the length of the encrypted data portion(s) in the data packet, information indicative of where the encrypted data portion(s) in the data packet fits within the entirety of the plaintext data, and/or generally any other information that facilitates reassembly of the data portions when decrypted by the decryptor. It is noted that in some cases the designation of a data portion of the plaintext data as a first data portion, a second data portion, a third data portion, and so forth, may be arbitrary, so long as information is provided to the decryptor to allow decryption of the encrypted data portions and reassembly of the plaintext data from the decrypted data portions.

At the decryptor, the decryptor may receive a first data portion of the encrypted data (e.g., a first encrypted data portion) from the encryptor. The decryptor may decrypt the first data portion using a first decryption key to provide a first decrypted data portion. The decryptor may generate a second decryption key for decryption of a second data portion of the encrypted data based on the first decryption key. The second decryption key may also be based on the first decrypted data portion and/or the first encrypted data portion. For example, the second decryption key may be based on bitwise operations performed on the first decryption key and at least one of the first decrypted data portion or the first encrypted data portion.

The decryptor may iteratively decrypt a current encrypted data portion using a current decryption key, generate a next decryption key to be used in decrypting a next encrypted data portion, and switch to using the next decryption key for decrypting the next encrypted data portion. In this regard, at an $n^{th}$ iteration, the decryptor may generate an $n^{th}$ decryption key to decrypt an $n^{th}$ encrypted data portion based at least on an $(n-1)^{th}$ decryption key previously generated and used to decrypt an $(n-1)^{th}$ encrypted data portion. The $n^{th}$ decryption key may also be based on the $(n-1)^{th}$ encrypted data portion and/or the decrypted $(n-1)^{th}$ data portion. In this regard, the decryptor may receive information associated with the first decryption key and any subsequent decryption keys from the encryptor. For example, the decryptor may retrieve or derive the first decryption key based on the information indicative of the first encryption key received from the encryptor. The decryptor may perform operations, such as bitwise operations, on operands (e.g., a previously generated decryption key, previously decrypted data portion, and/or previously encrypted data portion) to generate subsequent decryption keys that correspond to operations and operands utilized by the encryptor to generate corresponding encryption keys.

The generation of different encryption keys (and corresponding decryption keys) for different data portions facilitates enhanced security, since no single encryption key is used to encrypt the entire plaintext data. For example, even in a case that a decryption key is stored by the decryptor and an attacker is able to retrieve the decryption key, the attacker may use the decryption key to decrypt only one of the encrypted data portions, since other encrypted data portions are associated with different decryption keys. In an embodiment, for a next plaintext data to be encrypted and subsequently decrypted, the encryption and decryption processes may start anew, with a new key exchange performed by the encryptor and decryptor.

In one or more embodiments, the key material and/or associated data may be erased after use. On the encryption side, the key material may be an encryption key and the associated data may be the data (e.g., data portion) that is encrypted using the encryption key. On the decryption side, the key material may be a decryption key and the associated data may be the encrypted data (e.g., encrypted data portion) that is decrypted using the decryption key. In an aspect, the key material may be generated by a random bit generator(s) (e.g., true random bit generator(s)) and/or derived from random bit streams (e.g., true random bit streams). In an aspect, the key material is generally any sequence of bits that need not be, or need not be based on, truly random bit streams.

In an embodiment, a computing device may receive first data in a first memory and a first key in a second memory. The computing device may generate, using a logic circuit, a second data based on the first data and the first key. The computing device may provide the second data for transmission. The computing device may erase the first key and/or first data. The erasing of the first key and/or first data may occur within one clock cycle (e.g., in the same clock cycle as the second data being generated). For example, the erasing may occur in one-half clock cycle of generating the second data. In some cases, the first key and/or first data may be erased by overwriting with a predetermined bit value (e.g., all memory cells are overwritten with a 1 value) or predetermined sequence of bit values. In other cases, the first key and/or first data may be erased by feeding a result of the logic circuit back into the first memory and/or second memory. In an aspect, the first key and/or first data may be erased using different mechanisms. The erasing of the key and/or associated data may shorten the duration of time that the key and/or associated data remain stored in their respective memories, thus enhancing security at least by reducing the amount of time available for an attacker to obtain such information. In addition, the erasing of the key and/or associated data prevents reuse of the key and/or associated data after use of the key to encrypt or decrypt the associated data.

On the encryption side, the computing device may be an encryptor, with the received first data being plaintext data (e.g., plaintext data portion) and the first key being an encryption key. In some cases, the first data portion may be a portion of a larger plaintext data. In these cases, a second encryption key for encryption of a second data portion of the larger plaintext data may be generated based on the first encryption key. The second encryption key may also be based on the first data portion and/or the first encrypted data portion.

On the decryption side, the computing device may be a decryptor, with the received first data being first encrypted data and the first key being a decryption key. In some cases, the first data may be a portion of a larger encrypted data. In these cases, a second decryption key for decryption of a second encrypted data portion of the larger encrypted data may be generated based on the first decryption key. In some cases, the second decryption key may also be based on the first encrypted data portion and/or the first decrypted data portion.

In some embodiments, on the encryption side, the plaintext data and/or encrypted data may be alternatively and/or additionally encrypted using other encryption techniques. As one example, the plaintext data and/or encrypted data may be encrypted (e.g., further encrypted in some cases) one or more using encryption techniques such as, by way of non-limiting example, a Data Encryption Standard (DES) encryption algorithm, Advanced Encryption Standard (DES) encryption algorithm, other symmetric encryption algorithm, asymmetric encryption algorithm, and/or other type of encryption. Similarly, on the decryption side, the encrypted data and/or decrypted data may be alternatively and/or additionally decrypted using other decryption techniques, such as using one or more of DES, AES, other symmetric decryption algorithm, asymmetric decryption algorithm, and/or other type of decryption.

Referring now to the drawings, FIG. 1 illustrates an example network environment 100 in which data encryption/decryption and data communication (e.g., transmission, reception) may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

The network environment 100 includes computing devices 105A-D and a network 110. The computing devices 105A-D may communicate (e.g., transmit and/or receive) data to one another. For example, the computing devices 105A-D may encrypt data, decrypt data, and communicate encrypted data (e.g., transmit, receive, and/or store information securely). The computing devices 105A-D may be connected together directly and/or via the network 110. In FIG. 1, the computing devices 105A-D are connected to the network 110 via respective connections 115A-D, and the computing devices 105A and 105C are directly connected via a connection 115E. In some cases, the computing devices 105A-D may be processors and/or processes using inter-processor and/or inter-process communication, which may be between processors and/or processes connected together or across the network 110.

Each of the computing devices 105A-D may include any system, device, and/or combination of systems and/or devices that is able to establish one or more connections (e.g., wired, wireless, cellular, and/or optical connection) to communicate with another system, device, and/or combination of systems and/or devices. As an example, each of the connections 115A-E may represent one or more wired, wireless, cellular, optical, and/or other connections for facilitating connection between the computing devices 105A-D. The computing devices 105A-D may include, by way of non-limiting example, a server, a desktop server, a web server, a cloud-based server, a desktop computer, an airplane computer, a satellite computer, a client computer, a host computer, a point-of-sale device, a computer cluster, a notebook computer, a laptop computer, a handheld computer, a mobile phone (e.g., smart phone), a personal digital assistant, a tablet, or the like. In an embodiment, any one of the computing devices 105A-D may include systems described herein, such as the example systems provided in FIGS. 3, 5, 6, 7A-7C, 8A-8C, 9A-9C, 10, and 15-17. In an embodiment, any one of the computing devices 105A-D may perform processes described herein, such as the example processes provided in FIGS. 4, 11-14, and 18.

The connections 115A-E may be utilized for transmitting and receiving data (e.g., encrypted data). In some cases, the connections 115A-E may be utilized for key exchange for facilitating encryption and decryption of communicated data. For example, to facilitate secure communication between the computing devices 105A and 105C, the computing devices 105A and 105C may perform a key exchange to facilitate encryption and decryption of data communicated between the computing devices 105A and 105C. Communications associated with the key exchange may be through the connection 115E; through the connections 115A and 115C and the network 110; and/or other connections.

The network 110 may be a network, or any collection of distinct networks operating wholly or partially in conjunction, to provide connectivity to the computing devices 105A-D and allow communication of data and associated information (e.g., key information) between the computing devices 105A-D. For example, the network 110 over which the computing devices 105A-D communicate may include, by way of non-limiting example, the Internet, a telephonic network, a cellular network, a fiber network, a wireless network, a cloud-based network, a point-of-sale network, a private network (e.g., intranet), a local area network (LAN), a wide area network (WAN), a personal area network (PAN), or a combination thereof. In one case, communications may be achieved by a secure communications protocol, such as secure sockets layer (SSL) or transport layer security (TLS).

In an embodiment, one or more of the computing devices 105A-D may be a client device and one or more of the computing devices 105A-D may be a server device (e.g., a host server). For example, the computing devices 105A and 105B may be client devices and the computing device 105D may be server devices. In this example, the computing device 105C may host a network resource that serves the computing devices 105A and 105B. The network resource may include web-based services (e.g., news website), cloud-based services (e.g., data storage services), point-of-sale services, application services, and/or other services. Communications over the network 110 may be client-to-client, client-to-server, server-to-client, and/or server-to-server. In some cases, a hierarchical client-server relationship may be implemented by the computing devices 105A-D. For example, the computing device 105C may be a server device for providing service to the computing device 105A, whereas the computing device 105C may be a client device for receiving service from the computing device 105D. As another example, the computing device 105C may be a server device of the computing device 105D for purposes of one application (e.g., or aspect of an application) and may be a client device of the computing device 105D for purposes of another application (e.g., or another aspect of the application).

Although the foregoing describes the computing devices 105A-D in which two are client devices and two are server devices, the network environment 100 may include any number of computing devices (e.g., any number of client devices and any number of server devices) in communication with each other and/or over the network 110. In addition, the connections 115A-E are provided by way of non-limiting example. Additional, fewer, and/or different connections may be provided between the computing devices 105A-D.

Figure 2:
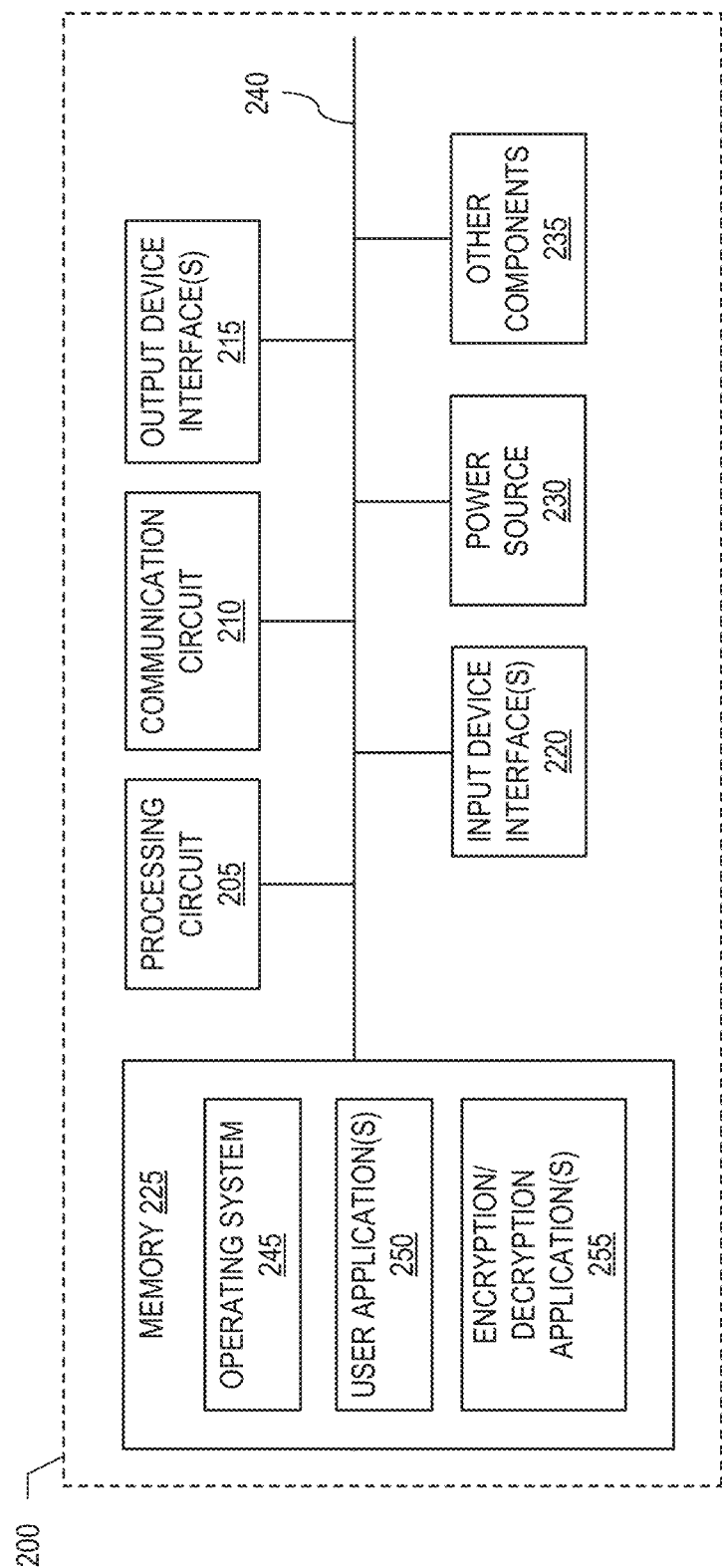
FIG. 2 illustrates an example computing device in which data encryption/decryption and data communication may be implemented in accordance with one or more embodiments of the present disclosure.

FIG. 2 illustrates an example computing device 200 in which data encryption/decryption and data communication (e.g., transmission, reception) may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. In an embodiment, the computing device 200 may be, may include, or may be a part of, any one of the computing devices 105A-D of FIG. 1. In an aspect, the dashed line in FIG. 2 may represent a housing of the computing device 200.

The computing device 200 includes a processing circuit 205, a communication circuit 210, one or more output device interfaces 215, one or more input device interfaces 220, a memory 225, a power source 230, other components 235, and a bus 240. The processing circuit 205 may execute machine readable instructions (e.g., software, firmware, or other instructions) stored in the memory 225. In an embodiment, the processing circuit 205 may execute the instructions to perform processes described herein, such as the example processes provided in FIGS. 4, 11-14, and 18. The processing circuit 205 may be, may include, or may be a part of, one or more logic circuits (e.g., encryption logic circuits, decryption logic circuits, etc.) in the computing device 200. The processing circuit 205 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices.

The communication circuit 210 may be configured to handle, manage, or otherwise facilitate wired and/or wireless communication between various components of the computing device 200 and between the computing device 200 and another computing device. In an embodiment, the communication circuit 210 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 210 may be configured for a proprietary wireless communication protocol and interface. The communication circuit 210 may include, or may be in communication with, an antenna for wireless communication. Thus, in one embodiment, the communication circuit 210 may handle, manage, or otherwise facilitate wireless communication by establishing a wireless link to a handheld device, base station, wireless router, hub, or other wireless networking device.

The communication circuit 210 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 210 may support proprietary wired communication protocols and interfaces. The communication circuit 210 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The output device interface(s) 215 may couple the computing device 200 to one or more output devices. The output device interface(s) 215 may include a graphics and/or audio driver card, graphics and/or audio driver chip, and/or graphics and/or audio driver processor. The output device(s) may enable the computing device 200 to provide output information to a user. For example, the output device(s) may include one or more display devices. The display device(s) may be utilized to display information to the user, such as web content in a web browser application running on the computing device 200. As an example, such web content may be encrypted by a server device and transmitted to the computing device 200. The computing device 200 may decrypt the encrypted web content and display the decrypted web content on a display device for consumption by the user.

The input device interface(s) 220 may couple the computing device 200 to one or more input devices. The input device(s) may enable the user to provide (e.g., enter) data and commands to the computing device 200. The input device(s) may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the computing device 200. In this regard, the user input may be received in any form, such as audio (e.g., speech), visual, and/or tactile. In some cases, the input device may be integrated with and may also be a part of a display, such as in a touch screen display.

The memory 225 may be utilized to store information for facilitating operation of the computing device 200. By way of non-limiting example, the memory 225 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 225 may include volatile memory, such as random-access memory (RAM), dynamic RAM (DRAM), static RAM (SRAM), etc. The memory 225 may store information such as instructions to be executed by the various components (e.g., the processing circuit 205) of the computing device 200, buffered information to be transmitted (e.g., by the communication circuit 210) such as truly random bit streams and encrypted data, and/or other information.

The memory 225 may store various software packages, such as an operating system (OS) 245, user application(s) 250, and/or encryption/decryption application(s) 255. The OS 245 may be any software that manages resources (e.g., hardware resources) of the computing device 200 and provides common services for other programs (e.g., user application(s) 250 and/or encryption/decryption application(s) 255). The user application(s) 250 may include, by way of non-limiting example, a web browsing application, a database application, a word processing application, an electronic mail application, a point-of-sale application, and/or other applications. The encryption/decryption application(s) 255 may include, by way of non-limiting example, instructions to facilitate encryption and decryption of data, generation of key material, generation of random bit streams (e.g., truly random bit streams), and/or other processes generally associated with data encryption/decryption and data communication.

In an embodiment, instructions associated with the OS 245, user application(s) 250, encryption/decryption application(s) 255, and/or other applications, may be executed by the processing circuit 205 to implement the steps and/or operations described herein, such as in FIGS. 4, 11-14, and 18. The user application(s) 250 and/or encryption/decryption application(s) 255 may take the form of a computer program product embodied in one or more machine reachable media having machine readable program code embodied thereon. In some cases, the instructions may be read into the memory 225 from another machine readable medium or from another system and/or device, for example, via the communication circuit 210. Alternatively and/or in addition, hardwired circuitry may be used in place of or in combination with the software instructions to implement the steps and/or operations described herein. As used herein, the term machine readable medium may refer to any medium that participates in providing instructions to the processing circuit 205 for execution. Any combination of one or more machine readable media may be utilized. As one example, the machine readable medium may include a machine readable storage medium, such as a non-transitory machine readable storage medium (e.g., the memory 225).

In one or more embodiments, secure communications may be facilitated through use of key material for encryption and decryption of data. In some aspects, the key material includes encryption keys and associated decryption keys generated based on one or more truly random bit streams. In some cases, each bit of the truly random bit stream has an absolutely equal probability of being a 1 or a 0. High speed generation of truly random bits may facilitate secure communications for the large amount of information flowing through a network, such as the network 110 of FIG. 1.

The power source 230 may supply power to operate the computing device 200, such as by supplying power the various components of the computing device 200. The power source 230 may be, or may include, one or more batteries (e.g., rechargeable batteries, non-rechargeable batteries). Alternatively or in addition, the power source 230 may be, or may include, one or more solar cells. The solar cells may be utilized to supply power to operate the computing device 200 and/or to charge one or more rechargeable batteries. In addition, the computing device 200 may include other components 235. By way of non-limiting example, the other components 235 may be used to implement any features of the computing device 200 as may be desired for various applications. As one example, the computing device 200 may include components for a radar imaging application, in which data gathered by the radar imaging application may be encrypted and transmitted (e.g., via the processing circuit 205 and the communication circuit 210). The bus 240 may be utilized to facilitate communication of data between the various components of the computing device 200.

Figure 3:
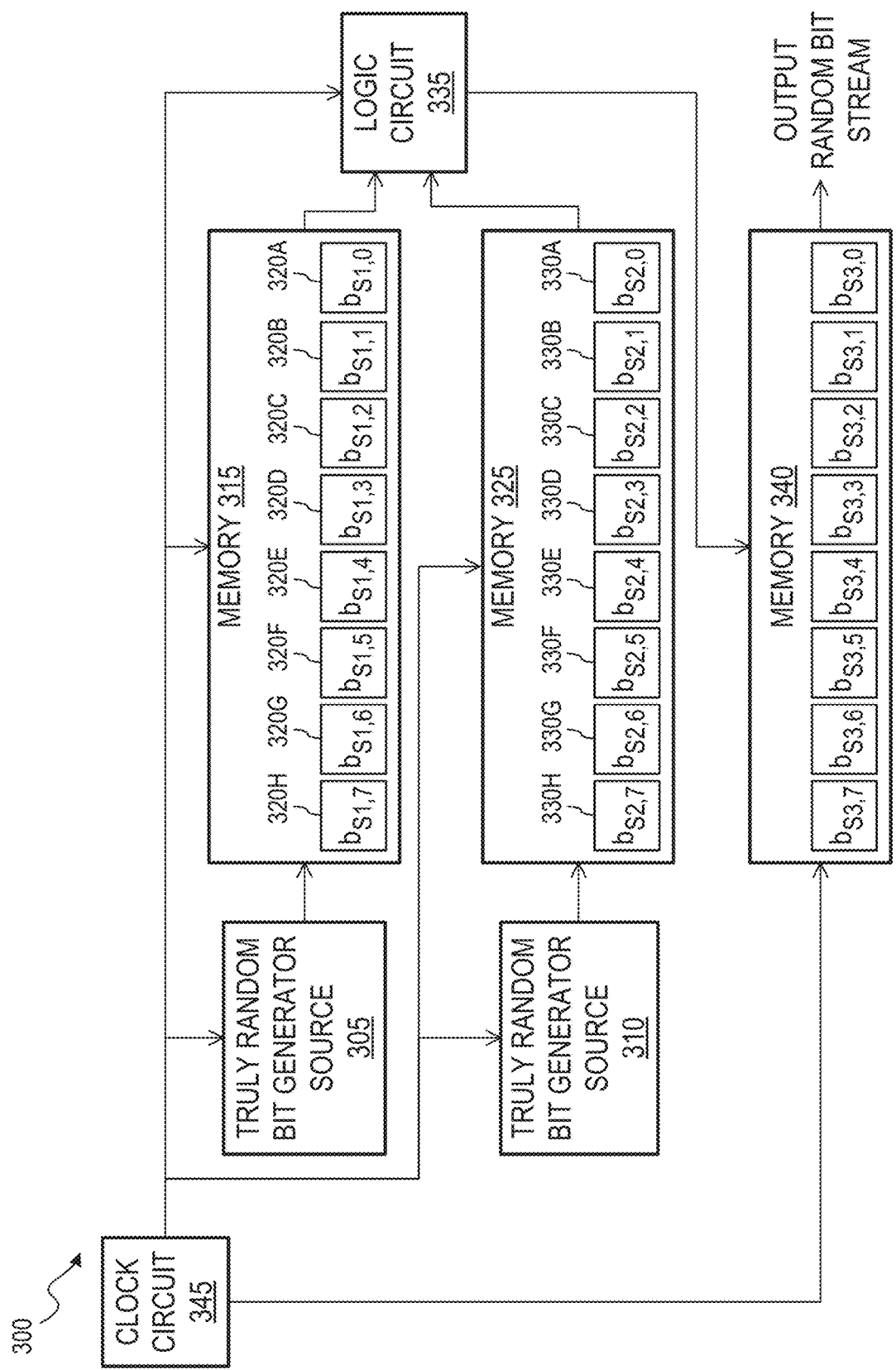
FIG. 3 illustrates a block diagram of a system for generating a truly random bit stream in accordance with one or more embodiments of the present disclosure.

FIG. 3 illustrates a block diagram of a system 300 for generating a truly random bit stream in accordance with one or more embodiments of the present disclosure. The system 300 includes truly random bit generator sources 305 and 310, memories 315, 325, and 340, a logic circuit 335, and a clock circuit 345. The truly random bit generator sources 305 and 310 may generate a truly random bit stream that is then stored in the memory 315 and 325, respectively. As shown in FIG. 3, the truly random bit generator source 305 may provide its generated truly random bit stream to memory cells 320A-H of the memory 315, and the truly random bit generator source 310 may provide its generated truly random bit stream to memory cells 330A-H of the memory 325. The logic circuit 335 may retrieve the truly random bit streams from the memory cells 320A-H and 330A-H and generate a truly random bit stream based on the retrieved truly random bit streams. In an aspect, the memories 315, 325, and/or 340 may be shift registers. It is noted that the memory cells 320A-H and 330A-H may represent a portion of the memories 315 and 325, respectively, allocated for facilitating truly random bit stream generation. The memories 315 and 325 may include other memory cells (not shown in FIG. 3) used for other purposes.

In an embodiment, to generate a truly random bit stream, the logic circuit 335 may perform bitwise operations on the truly random bit streams stored in the memory cells 320A-H and 330A-H. In one case, to generate each bit of its truly random bit stream, the logic circuit 335 may take one bit stored in the memory cells 320A-H as one operand and one bit stored in the memory cells 330A-H as another operand and perform a bitwise operation on the two operands. As an example of such a case, the logic circuit 335 may perform a bitwise operation on the truly random bit stored in the memory cell 320A and the truly random bit stored in the memory cell 330A, a bitwise operation on the truly random bit stored in the memory cell 320B and the truly random bit stored in the memory cell 330B, and so forth.

In an aspect, the random bit generator sources 305 and 310 may be true random generator circuits that generate unbiased and true random bits (e.g., each bit has an absolute 50% probability of being a 0 or a 1). In some cases of this embodiment, the truly random bit generator sources 305 and 310 may generate the true random bits based on quantum mechanical processes. In an aspect, the logic circuit 335 may combine the unbiased and true absolutely random bits received from the truly random bit generator sources 305 and 310 to generate another truly random bit stream that is an unbiased and true random bit stream. In some cases, the logic circuit 335 may perform a bitwise operation on the truly random bit streams from the truly random bit generator sources 305 and 310 that maintains the entropy associated with the truly random bit generator sources 305 and 310. For example, the bitwise operation may have logical equality, in which its gives a functional value true (e.g., 1) when both functional arguments have the same logical value and false (e.g., 0) when the functional arguments are different. The bitwise operation may be an XOR operation (represented by ⊕) for example, which has the truth table shown in the following Table 1. As another example, the bitwise operation may be an XNOR operation, which has the truth table shown in the following Table 2. As shown in Tables 1 and 2, these bitwise operations have a truth table in which half of the results are 0 and half of the results are 1.

TABLE 1

| XOR Operation | | |
|---|---|---|
| A | B | A ⊕ B |
| 0 | 0 | 0 |
| 0 | 1 | 1 |
| 1 | 0 | 1 |
| 1 | 1 | 0 |

TABLE 2

| XNOR Operation | | |
|---|---|---|
| A | B | (A ⊕ B)' |
| 0 | 0 | 1 |
| 0 | 1 | 0 |
| 1 | 0 | 0 |
| 1 | 1 | 1 |

As shown in FIG. 3, the logic circuit 335 may provide its generated truly random bit stream for transmission. In some cases, the truly random bit generator sources 305 and 310 may generate truly random bit streams of the same length (e.g., number of bits or bytes) to facilitate processing by the logic circuit 335. Although the truly random bit streams have a length of eight in FIG. 1, with the logic circuit 335 retrieving eight bits from each of the memories 315 and 325 in an iteration, it is noted the predetermined length can be any number of bits. In this regard, the truly random bits may be provided to the memories 315, 325, and/or 340 bit-by-bit (e.g., as each bit is generated) or in batches of bits (e.g., buffered after each bit is generated and then provided in batches). For instance, in the bit-by-bit case (e.g., the predetermined length is one), the logic circuit 335 may retrieve one bit from each of the memories 315 and 325, perform the bitwise operation on the pair of bits to obtain one truly random bit, and provide the result in the memory 340. In this case, the bit stream may be provided as a continuous bit stream in the memory 340. It is noted that the memories 315, 325, and/or 340 may have a different number of memory cells than those shown in FIG. 3.

In some cases, the number of bits in the truly random bit streams may be based on a desired security level. Based on the desired security level, the number of bits in the truly random bit stream may be 8 bits, 128 bits, 256 bits, or 512 bits, or generally any specified number of bits. As an example, when a 48-bit truly random bit stream is desired, the 48-bit truly random bit stream may be a combination (e.g., concatenation) of a first and second set of 8-bit truly random bit streams generated by the truly random bit generator source 305, a first and second set of 8-bit truly random bit streams generated by the truly random bit generator source 310, one set of 8-bit truly random bit stream generated by the logic circuit 335 based on the first sets of 8-bit truly random bit streams from the truly random bit generator sources 305 and 310, and another set of 8-bit truly random bit stream generated by the logic circuit 335 based on the second sets of 8-bit truly random bit streams from the truly random bit generator sources 305 and 310. As another example, when a 4-bit truly random bit stream is desired, four bits may be obtained by sampling from among the bits stored in the memory 315, 325, and/or 340. As such, the truly random bit generators 305 and/or 310; memories 315, 325, and/or 340; and/or logic circuit 335 may generate the number of bits needed for the desired security level over one iteration (e.g., one set of 8-bit truly random bit streams in each of the memories 315, 325, and 340) or over multiple iterations.

The clock circuit 345 may generate clock signals that synchronize operation of the truly random bit generator sources 305 and 310 and the logic circuit 335. In some cases, operation of the memories 315, 325, and/or 340 may also be synchronized using clock signals from the clock circuit 345. For example, when the memories 315, 325, and/or 340 are shift registers, the clock signals may control shifting operations of the shift registers. In some aspects, the logic circuit 335 may facilitate higher speed of generating truly random bit streams by performing low complexity, high speed bitwise operations on random bit streams (e.g., true random bit streams) generated by the truly random bit generator sources 305 and 310, and thus may increase the rate at which random bit streams (e.g., true random bit streams) are generated relative to a case in which the truly random bit generator sources 305 and 310 are generating all the truly random bit streams. In an embodiment, the truly random bit streams may be utilized as, or may be derivable into, key material.

In an embodiment, the system 300 may be implemented within the computing device 200. In some cases, the truly random bit generator sources 305 and 310 and/or logic circuit 335 may be implemented as part of the processing circuit 205, and/or the memories 315, 325, and/or 340 may be part of the memory 225 of FIG. 2. In another embodiment, the system 300 may be coupled to the computing device 200 and may provide generated truly random bit streams to be utilized by the computing device 200 (e.g., to generate key material).

Figure 4:
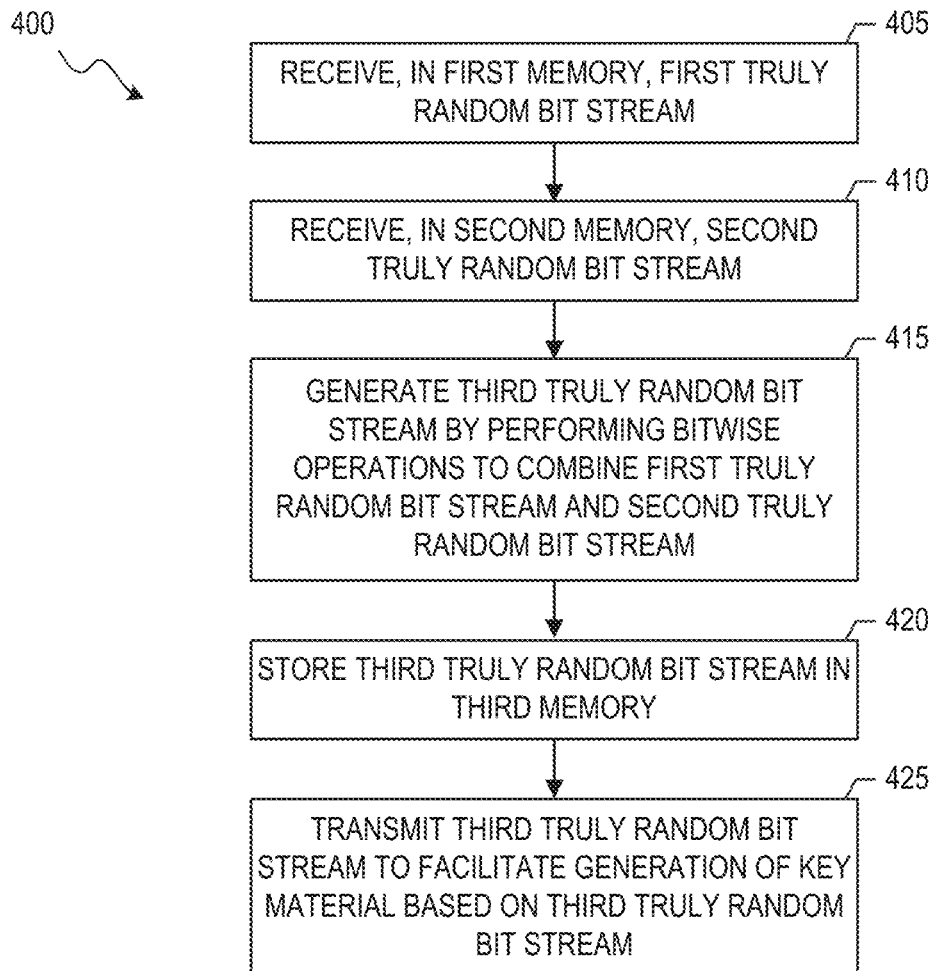
FIG. 4 illustrates a flow diagram of an example process for generating a truly random bit stream in accordance with one or more embodiments of the present disclosure.

FIG. 4 illustrates a flow diagram of an example process 400 for generating an absolutely truly random bit stream in accordance with one or more embodiments of the present disclosure. For explanatory purposes, the example process 400 is described herein with reference to the system 300 of FIG. 3; however, the example process 400 is not limited to the example system 300 of FIG. 3. Note that one or more operations may be combined, omitted, and/or performed in a different order as desired.

At block 405, a first truly random bit stream is received in the memory 315. At block 410, a second truly random bit stream is received in the memory 325. The first and second truly random bit streams may be provided by the truly random bit generator sources 305 and 310, respectively. At block 415, the logic circuit 335 generates a third truly random bit stream by performing bitwise operations to combine the first and second truly random bit streams. In an aspect, each bit of the third truly random bit stream may be obtained by performing a bitwise operation with one operand being a bit from the first truly random bit stream and another operand being a bit from the second truly random bit stream. As an example, a truly random bit $b_{S1,0}$ in the memory cell 320A may be combined with a truly random bit $b_{S2,0}$ in the memory cell 330A to generate a truly random bit $b_{S3,0}$ to be stored (e.g., buffered) in the memory 340. In this regard, the bitwise operation may preserve the entropy of truly random bit streams generated by the truly random bit generator sources 305 and 310. For example, the bitwise operation may have logical equality, such as an XOR or XNOR operation.

At block 420, the third truly random bit stream is stored in the memory 340. At block 425, the third truly random bit stream is provided for transmission. The third truly random bit stream may be provided to the processing circuit 205 for use as, or for use in deriving, key material (e.g., an encryption key). For example, the third truly random bit stream may be generated and transmitted to the processing circuit 205 of FIG. 2 in response to a request (e.g., from the processing circuit 205) for a truly random bit stream (e.g., for use as key material for encrypting data to be transmitted). In an embodiment, the first, second, and third random bit streams may be absolutely true and unbiased random bit streams. In one case, the first, second, and third random bit streams may have the same length.

Figure 5:
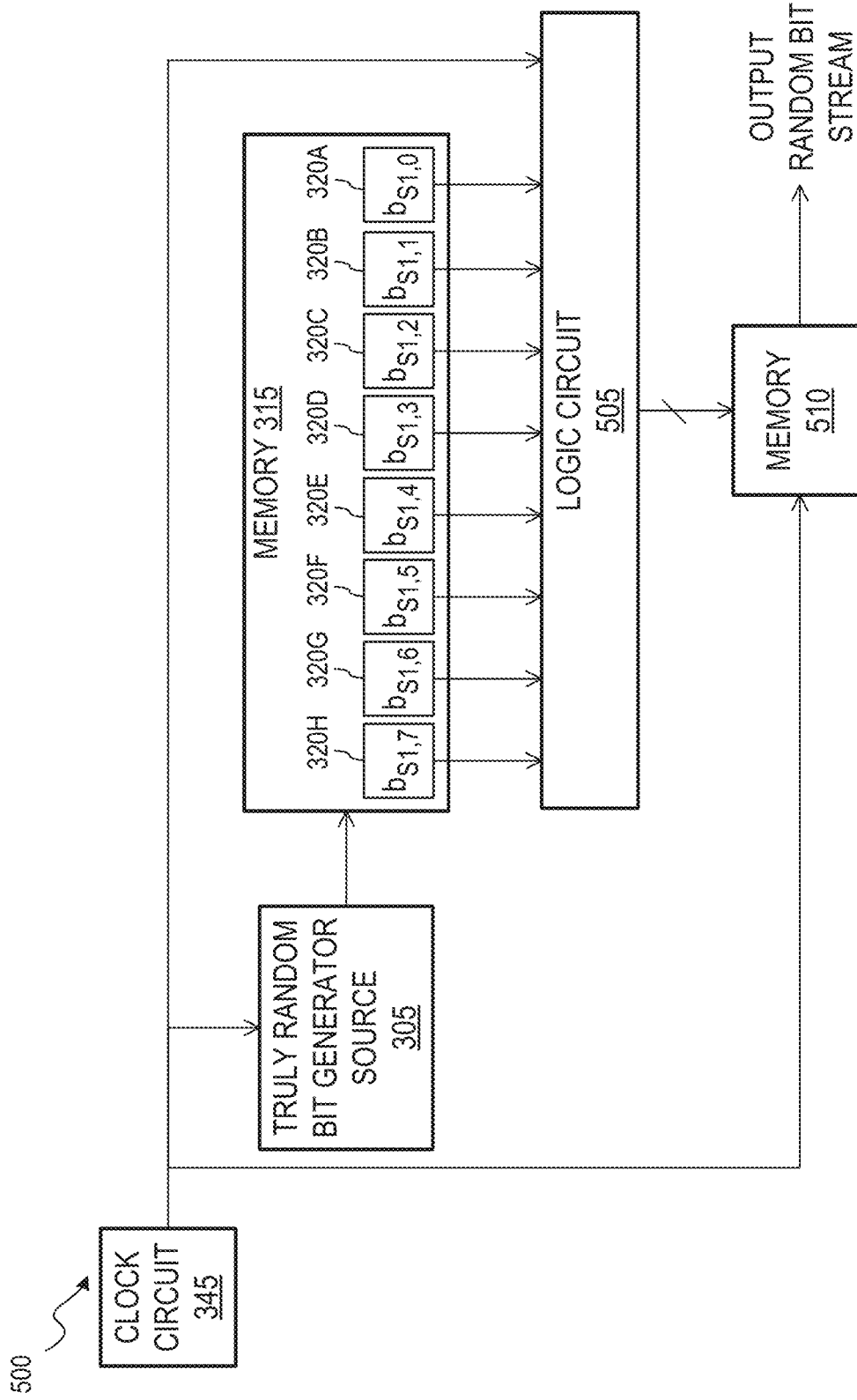

FIG. 5 illustrates a block diagram of a system 500 for generating a truly random bit stream in accordance with one or more embodiments of the present disclosure. The system 500 includes the truly random bit generator source 305, memory 315, and clock circuit 345 shown in FIG. 3. The system 500 also includes a logic circuit 505 and a memory 510. The truly random bit generator source 305 may generate a truly random bit stream that is then stored in the memory 315. The logic circuit 505 may retrieve the truly random bit stream from the memory cells 320A-H of the memory 315 and generate a new truly random bit stream based on the retrieved truly random bit stream. In an aspect, the logic circuit 505 may perform bitwise operations (e.g., XOR operations) on two or more bits of the retrieved truly random bit streams to generate each bit of the new truly random bit stream. The logic circuit 505 may store the generated truly random bit stream in the memory 510. In an embodiment, the truly random bit stream provided in the memory 315 and the truly random bit stream generated by the logic circuit 505 may be true and unbiased random bit streams. In an embodiment, the system 500 may be implemented within the computing device 200. In some cases, the truly random bit generator source 305 and/or logic circuit 505 may be implemented as part of the processing circuit 205, and/or the memory 510 may be part of the memory 225 of FIG. 2. In another embodiment, the system 500 may be coupled to the computing device 200 and may provide generated truly random bit streams to be utilized by the computing device 200.

FIG. 6 illustrates a block diagram of a system 600 for generating a truly random bit stream in accordance with one or more embodiments of the present disclosure. The system 600 includes the truly random bit generator source 305, the memory 315, the clock circuit 345, and a logic circuit 605. The logic circuit 605 may retrieve the truly random bit stream from the memory cells 320A-H of the memory 315 and generate a truly random bit stream including truly random bits $b_{S4,6}$, $b_{S4,5}$, $b_{S4,4}$, $b_{S4,3}$, $b_{S4,2}$, $b_{S4,1}$, and $b_{S4,0}$ based on the retrieved truly random bit streams. The logic circuit 605 may generate each truly random bit by performing a bitwise operation between pairs of bits stored in the memory. In this regard, the logic circuit 605 may include combiners 610A-G that each receive a pair of bits from the memory 315. In some cases, each of the combiners 610A-G may receive a pair of bits from memory cells that are, are referenced as being, or otherwise referred to as being adjacent. For example, in FIG. 6, the memory cell 320A may be referred to as being adjacent to the memory cell 320B, the memory cell 320B may be referred to as being adjacent to the memory cells 320A and 320C, and so forth. In some cases, the combiners 610A-G may implement a bitwise operation having logical equality, such as an XOR operation or an XNOR operation.

In an embodiment, the clock circuit 345 generates clock signals for facilitating synchronization of the truly random bit generator source 305, memory 315, and logic circuit 605. The logic circuit 605 may be, may include, or may be a part of, the logic circuit 505 of FIG. 5. These truly random bits generated by the logic circuit 605 may be provided for storage (e.g., in memory such as the memory 510) and/or for transmission.

Although FIG. 6 illustrates one combiner for each pair of bits of the memory 315, the system 600 may include fewer combiners, more combiners, and/or a different arrangement of combiners. In some cases, a single combiner may be utilized to perform a bitwise operation on pairs of bits from the memory 315. For example, in one clock cycle, the single combiner may generate the bit $b_{S4,0}$ based on the bits $b_{S1,1}$ and $b_{S1,0}$; in a next clock cycle, the single combiner may generate the bit $b_{S4,1}$ based on the bits $b_{S1,2}$ and $b_{S1,1}$; and so forth for each subsequent clock cycle. In some cases, two or more combiners, such as shown in FIG. 6, may be operated in parallel such that multiple bits may be generated in a single clock cycle. Using two or more combiners may allow for a higher rate of truly random bit generation than a case with one combiner, but may utilize additional chip real-estate and/or add processing complexity over the case with one combiner.

In some aspects, to generate bits subsequent to the bit $b_{S4,6}$, truly random bits may be provided to the memory 315. For example, the logic circuit 605 may generate a next truly random bit $b_{S4,7}$ based on the truly random bit $b_{S1,7}$ and a truly random bit $b_{S1,8}$ (not shown in FIG. 6) provided to the memory 315. In some cases, such as when the memory 315 is allocated only the memory cells 320A-H for use in truly random bit generation, providing the truly random bit $b_{S1,8}$ may be associated with removing a bit currently stored in one of the memory cells 320A-H. The new bit (e.g., $b_{S1,8}$) provided to the memory 315 may cause an oldest truly random bit (e.g., $b_{S1,0}$) in the memory 315 to be removed from the memory 315. In this regard, the memory 315 may receive one new truly random bit and remove one old truly random bit in each clock cycle. As an example, in an aspect, the memory 315 may be implemented as a shift register that shifts out the bit $b_{S1,0}$ stored in the memory cell 320A, shifts over (e.g., right shifts) the bits $b_{S1,7}$ through $b_{S1,1}$ such that the $b_{S1,7}$ is moved from the memory cell 320H to the memory cell 320G, the bit $b_{S1,1}$ is moved from the memory cell 320B to the memory cell 320A, and so forth, and shifts the bit $b_{S1,8}$ into the memory cell 320H. An example of a shift register implementation is described with respect to FIGS. 7A through 7C.

FIGS. 7A through 7C illustrate block diagrams of a system 700 for generating a truly random bit over sequential clock cycles in accordance with one or more embodiments of the present disclosure. The system 700 includes the truly random bit generator source 305, the clock circuit 345, a memory 705, and a logic circuit 715. The memory 705 includes memory cells 710A-H. In an embodiment, the system 700 of FIGS. 7A-7C may be, or may be considered to be, a shift register implementation of the system 600 of FIG. 6. For instance, the memory cells 710A-H of the memory 705 may correspond with the memory cells 320A-H, respectively, of the memory 315. Clock cycles may be defined by the clock circuit 345.

FIG. 7A illustrates generation of a truly random bit during clock cycle 1. In FIG. 7A, the memory cells 710A, 710B, . . . , 710H contain bits $b_{S1,0}$, $b_{S1,1}$, . . . , $b_{S1,7}$ respectively. The logic circuit 715 may receive the bits $b_{S1,0}$ and $b_{S1,1}$ from the memory cells 710A and 710B, respectively, and perform a bitwise operation (e.g., XOR or XNOR operation) to generate a bit $b_{S4,0}$. The memory 705 may then be shifted such that the bit $b_{S1,0}$ at the memory cell 710A is shifted out, the bit $b_{S1,1}$ at the memory cell 710B is right shifted into the memory cell 710A, the bit $b_{S1,7}$ at the memory cell 710H is right shifted into the memory cell 710G, and so forth. The memory 705 may receive a new truly random bit $b_{S1,8}$ in the memory cell 710H from the truly random bit generator source 305. At the end of clock cycle 1, the memory cells 710A, 710B, . . . , 710H contain bits $b_{S1,1}$, $b_{S1,2}$, . . . , $b_{S1,8}$, respectively. In an aspect, such combining of pairs of bits of the truly random bit stream from the truly random bit generator source 305 may be referred to as intermixing the truly random bit stream with itself.

FIG. 7B illustrates generation of a truly random bit during clock cycle 2. The logic circuit 715 may receive the bits $b_{S1,1}$ and $b_{S1,2}$ from the memory cells 710A and 710B, respectively, and perform a bitwise operation to generate a bit $b_{S4,1}$. The memory 705 may be then shifted to shift out the bit $b_{S1,1}$ from the memory cell 710A, right shift bits $b_{S1,2}$ through $b_{S1,8}$, and shift in a new bit $b_{S1,9}$ received from the truly random bit generator source 305 into the memory cell 710H. FIG. 7C illustrates generation of a truly random bit during clock cycle 3. The logic circuit 715 may receive the bits $b_{S1,2}$ and $b_{S1,3}$ from the memory cells 710A and 710B, respectively, and perform a bitwise operation to generate a bit $b_{S4,2}$. Subsequent clock cycles may generate subsequent bits, which may be part of a truly random bit stream to be stored and/or transmitted, such as for use in generating key material. In an aspect, the random bit generator source 305 may generate unbiased and true random bit streams. In an aspect, when a bitwise operation having logical equality (e.g., XOR or XNOR truth table) is used for intermixing, the intermixing of an absolutely unbiased and true random bit stream with itself generates another absolutely unbiased and true random bit stream.

FIGS. 8A through 8C illustrate block diagrams of a system 800 for generating a truly random bit over sequential clock cycles in accordance with one or more embodiments of the present disclosure. The description of FIGS. 7A-7C generally applies to FIGS. 8A-8C, with examples of differences described herein. In FIGS. 8A through 8C, rather than receiving and processing the bits stored in the memory cells 710A and 710B in each clock cycle as performed by the logic circuit 715 of FIGS. 7A through 7C, the logic circuit 805 receives and processes the bits stored in the memory cells 710A and 710C in each clock cycle.

FIG. 8A illustrates generation of a truly random bit during clock cycle 1. In FIG. 8A, the logic circuit 805 may receive the bits $b_{S1,0}$ and $b_{S1,2}$ from the memory cells 710A and 710C, respectively, and perform a bitwise operation (e.g., XOR operation) to generate a bit $b_{S5,0}$. The memory 705 may then be shifted such that the bit $b_{S1,0}$ at the memory cell 710A is shifted out, the bit $b_{S1,1}$ at the memory cell 710B is right shifted into the memory cell 710A, the bit $b_{S1,7}$ at the memory cell 710H is right shifted into the memory cell 710G, and so forth. The memory 705 may receive a new truly random bit $b_{S1,8}$ in the memory cell 710H from the truly random bit generator source 305. At the end of clock cycle 1, the memory cells 710A, 710B, . . . , 710H contain bits $b_{S1,1}$, $b_{S1,2}$, . . . , $b_{S1,8}$, respectively.

FIG. 8B illustrates generation of a truly random bit during clock cycle 2. The logic circuit 805 may receive the bits $b_{S1,1}$ and $b_{S1,3}$ from the memory cells 710A and 710C, respectively, and perform a bitwise operation to generate a bit $b_{S5,1}$. The memory 705 may be then be shifted to shift out the bit $b_{S1,1}$ from the memory cell 710A, right shift bits $b_{S1,2}$ through $b_{S1,8}$, and shift in a new bit $b_{S1,9}$ received from the truly random bit generator source 305 into the memory cell 710H. FIG. 8C illustrates generation of a truly random bit during clock cycle 3. The logic circuit 805 may receive the bits $b_{S1,2}$ and $b_{S1,4}$ from the memory cells 710A and 710C, respectively, and perform a bitwise operation to generate a bit $b_{S5,2}$. Subsequent clock cycles may generate subsequent bits.

It is noted that, although the clock cycles for FIGS. 7A-7C and FIGS. 8A-8A are referred to as being clock cycle 1, 2, and 3, respectively, such an index (e.g., 1, 2, 3) is utilized for convenience to indicate that these clock cycles are temporally adjacent clock cycles. In this regard, there may be clock cycles that have occurred before clock cycle 1. The systems 700 and 800 may be operated in parallel such that the truly random bit stream from the truly random bit generator source 305 may be intermixed with itself at different points (e.g., the memory cells 710A and 710B mix in the system 700, the memory cells 710A and 710C mix in the system 800). In an aspect, one or more logic circuits may combine bits stored in any pair of the memory cells 710A-H. Such parallel intermixing may facilitate higher rate of truly random bit stream generation.

FIGS. 9A through 9C illustrate a block diagram of a system 900 for generating a truly random bit stream over sequential clock cycles in accordance with one or more embodiments of the present disclosure. The description of FIGS. 7A-7C, and FIGS. 8A-8C, generally applies to FIGS. 9A-9C, with examples of differences described herein. The system 900 includes the truly random bit generator source 305 and memory cells 910A-H. In an embodiment, the memory cells 910A-H may be part of the memory 315. In some cases, the memory cells 910A-H may be part of a shift register. In FIGS. 9A-9C, a connection 915 from the memory cell 910A to each of memory cells 910B-H is a shorthand representation that the random bit stored in the memory cell 910A is combined with the random bit stored in the memory cells 910B-H. The combining may be performed by a logic circuit and may include a bitwise operation, such as an XOR or an XNOR operation. For example, the logic circuit may include one or more combiners that each receives a respective pair of bits and combines the pair of bits.

FIG. 9A illustrates generation of a random bit stream during clock cycle 1, In FIG. 9A, the memory cells 910A, 910B, . . . , 910H contain bits $b_{S1,0}$, $b_{S1,1}$, . . . , $b_{S1,7}$, respectively. The bit $b_{S1,0}$ may be combined with each of $b_{S1,1}$, $b_{S1,2}$, $b_{S1,3}$, $b_{S1,4}$, $b_{S1,5}$, $b_{S1,6}$, and $b_{S1,7}$ to generate bits $b_{S4,0}$, $b_{S5,0}$, $b_{S6,0}$, $b_{S7,0}$, $b_{S8,0}$, $b_{S9,0}$, and $b_{S10,0}$, respectively, as shown in row 920. In an aspect, the memory cells 910A-H may be implemented by a shift register. After the bitwise operation is performed, the shift register may be shifted such that the bit $b_{S1,0}$ at the memory cell 910A is shifted out, the remaining bits are right shifted, and a new bit (e.g., truly random bit) $b_{S1,8}$ is provided into the memory cell 910H from the truly random bit generator source 305. In another aspect, rather than a shift register, memory references may be adjusted as appropriate such that the truly random bit $b_{S1,1}$ is combined with the truly random bits $b_{S1,2}$, $b_{S1,3}$, $b_{S1,4}$, $b_{S1,5}$, $b_{S1,6}$, $b_{S1,7}$, and $b_{S1,8}$ in clock cycle 2. At the end of clock cycle 1, the memory cells 910A, 910B, . . . , 910H contain bits $b_{S1,1}$, $b_{S1,2}$, . . . , $b_{S1,8}$, respectively.

FIG. 9B illustrates generation of a truly random bit stream during clock cycle 2. The bit $b_{S1,1}$ may be combined with the truly random bits $b_{S1,2}$, $b_{S1,3}$, $b_{S1,4}$, $b_{S1,5}$, $b_{S1,6}$, $b_{S1,7}$, and $b_{S1,8}$ to generate truly random bits $b_{S4,1}$, $b_{S5,1}$, $b_{S6,1}$, $b_{S7,1}$, $b_{S8,1}$, $b_{S9,1}$, and $b_{S10,1}$, respectively, as shown in row 925. FIG. 9C illustrates generation of a truly random bit stream during clock cycle 7. The bit $b_{S1,6}$ may be combined with each of $b_{S1,7}$, $b_{S1,8}$, $b_{S1,9}$, $b_{S1,10}$, $b_{S1,11}$, $b_{S1,12}$, and $b_{S1,13}$, to generate bits $b_{S4,6}$, $b_{S5,6}$, $b_{S6,6}$, $b_{S7,6}$, $b_{S8,6}$, $b_{S9,6}$, and $b_{S10,6}$, respectively, as shown in row 930.

Figure 9D:
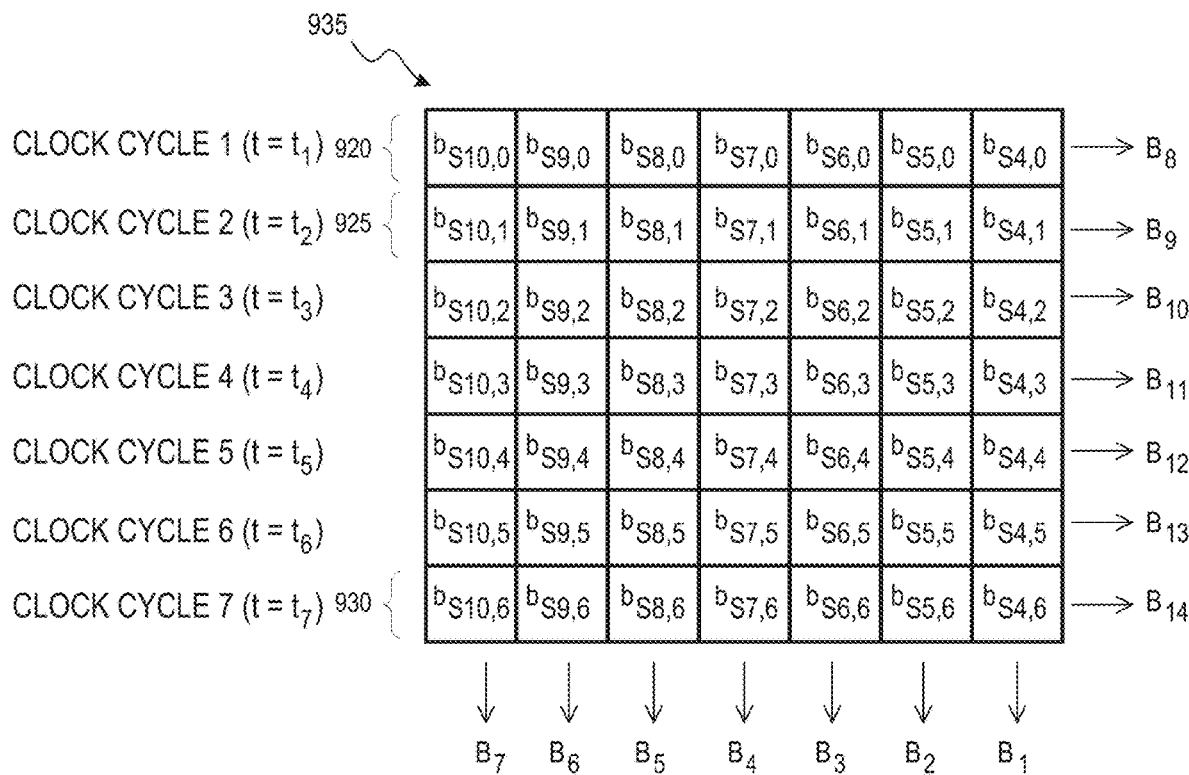
FIG. 9D illustrates generation of truly random bit streams over sequential clock cycles in accordance with one or more embodiments of the present disclosure.

FIG. 9D illustrates generation of truly random bit streams over sequential clock cycles in accordance with one or more embodiments of the present disclosure. In this regard, FIG. 9D shows a matrix 935 that includes the rows 920, 925, and 930 from FIGS. 9A, 9B, and 9C for clock cycles 1, 2, and 7, respectively, along with rows associated with intervening clock cycles. As shown in FIGS. 9A-9D, the 14 truly random bits $b_{S1,0}$ through $b_{S1,13}$ generated by the truly random bit generator source 305 are used to generate seven 7-bit truly random bit streams $B_1$ through $B_7$. In this example, the two sets of seven truly random bits (e.g., $b_{S1,0}$ through $b_{S1,6}$ and $b_{S1,7}$ through $b_{S1,13}$) generated by the truly random bit generator source 305 provide nine 7-bit truly random bit streams (e.g., $B_1$ through $B_7$, plus $b_{S1,0}$ through $b_{S1,6}$, and $b_{S1,7}$ through $b_{S1,13}$).

In some cases, truly random bits generated over the clock cycles may be sampled to provide additional bit streams. As an example, one bit from each of $B_1$ through $B_7$ may be sampled to provide truly random bit streams $B_8$ through $B_{14}$. For instance, the truly random bit stream $B_8$ may include the truly random bits provided by the row 920 (e.g., $b_{S4,0}$, $b_{S5,0}$, $b_{S6,0}$, $b_{S7,0}$, $b_{S8,0}$, $b_{S9,0}$, and $b_{S10,0}$). The truly random bit stream $B_8$ may be obtained by sampling a zeroth bit of each of truly random bit streams $B_1$ through $B_7$ or by providing the truly random bit stream $B_8$ for transmission and/or storage during clock cycle 1. Other manners by which to sample the bit streams $B_1$ through $B_7$ may be utilized alternatively and/or in addition to generate additional truly random bit streams. Thus, in the example shown in FIGS. 9A-9D, two sets of 7 truly random bits generated by the truly random bit generator source 305 may be utilized to generate many additional 7-bit truly random bit streams. In a case that a desired security level utilizes bit streams larger than seven bits, multiple of these 7-bit truly random bit streams may be concatenated or otherwise combined to obtain a truly random bit stream of a desired length. In a case that a desired security level utilizes fewer than 7-bit truly random bit streams, a 7-bit truly random bit stream may be sampled to obtain a truly random bit stream of a desired length.

Figure 10:
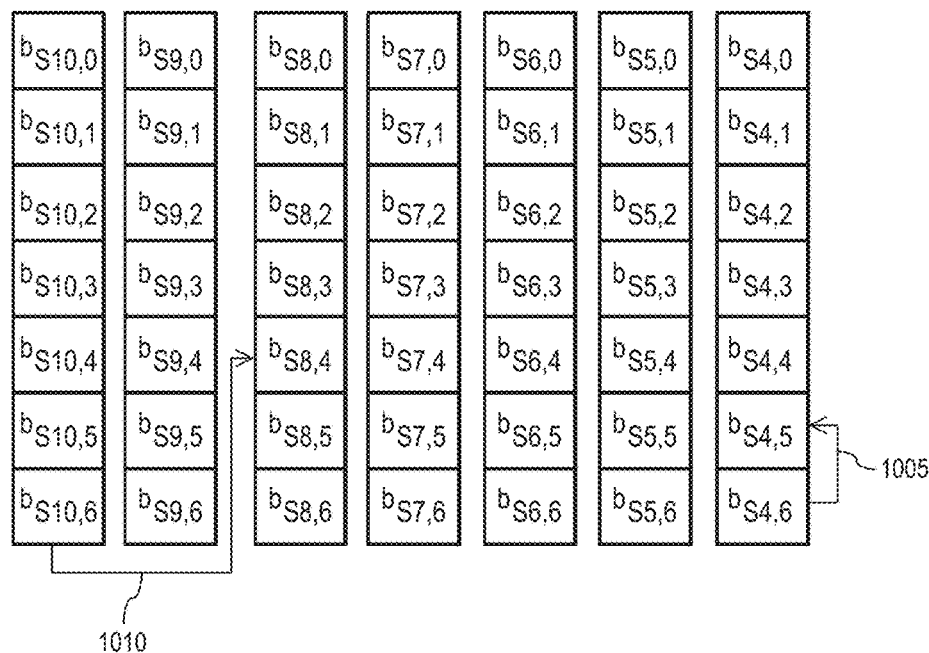
FIG. 10 illustrates generation of additional truly random bit streams through intermixing of one or more truly random bit streams in accordance with one or more embodiments of the present disclosure.

FIG. 10 illustrates generation of additional truly random bit streams through intermixing of one or more truly random bit streams in accordance with one or more embodiments of the present disclosure. The intermixing may be performed on the bit streams $B_1$ through $B_7$ shown in FIG. 9D. A connection 1005 from $b_{S4,6}$ to $b_{S4,5}$ is a shorthand representation to indicate intermixing of the truly random bit stream $B_1$ with itself (e.g., the $b_{S4,6}$ is combined with the bit $b_{S4,5}$). In one example, the truly random bit stream $B_1$ may be provided in a memory (e.g., a shift register) and coupled to a logic circuit that facilitates the intermixing. Such a system may be similar in architecture to the memory 705 and logic circuit 715 shown in FIGS. 7A-7C. In some cases, each of the other truly random bit streams $B_2$ through $B_7$ may also be intermixed with itself in a similar and/or different manner. A connection 1010 from $b_{S10,6}$ to $b_{S8,4}$ is a shorthand representation to indicate an intermixing of the truly random bit stream $B_7$ with the truly random bit stream $B_5$ (e.g., the $b_{S10,6}$ is combined with the bit $b_{S8,4}$). One or more memories may be provided to store the truly random bit streams $B_7$ and $B_5$ to facilitate such intermixing. As such, in an aspect, memory may be provided as appropriate to facilitate intermixing within a truly random bit stream and/or intermixing between different truly random bit streams.

Figure 11:
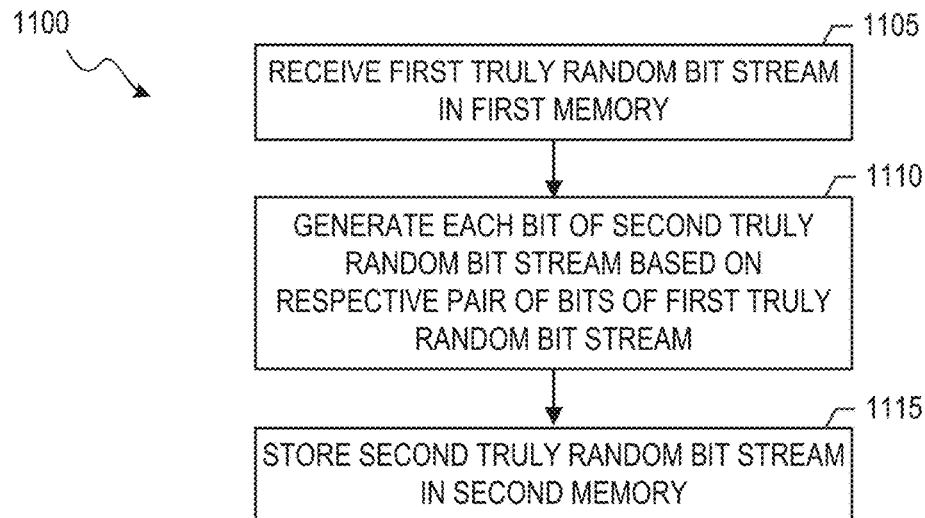
FIGS. 11 and 12 illustrate a flow diagram of example processes for generating a truly random bit stream in accordance with one or more embodiments of the present disclosure.

FIG. 11 illustrates a flow diagram of an example process 1100 for generating a truly random bit stream in accordance with one or more embodiments of the present disclosure. For explanatory purposes, the example process 1100 is described herein with reference to the system 700 of FIGS. 7A-7C; however, the example process 1100 is not limited to the example system 700 of FIGS. 7A-7C. For example, alternatively and/or in addition, the example process 1100 may be utilized with the example system 800 of FIGS. 8A-8C or the example system 900 in FIGS. 9A-9C. Note that one or more operations may be combined, omitted, and/or performed in a different order as desired.

At block 1105, a first truly random bit stream is received in the memory 705. The first truly random bit stream may be provided by the truly random bit generator source 305. At block 1110, the logic circuit 715 generates a second truly random bit stream, where each bit of this second truly random bit stream is based on a respective pair of bits of the first truly random bit stream. At block 1115, the second truly random bit stream is stored. In FIGS. 7A-7C, the pair of bits includes the bits stored in the memory cells 710A and 710B. In this example, during clock cycle 1, the truly random bit $b_{S1,0}$ is combined with the truly random bit $b_{S1,1}$ using the logic circuit 715 (e.g., performing an XOR operation) to obtain the truly random bit $b_{S4,0}$. During clock cycle 2, the truly random bit $b_{S1,1}$ is combined with the truly random bit $b_{S1,2}$ using the logic circuit 715 to obtain the truly random bit $b_{S4,1}$. In some cases, each bit of the second truly random bit stream may be stored as the bit is output by the logic circuit 715.

Figure 12:
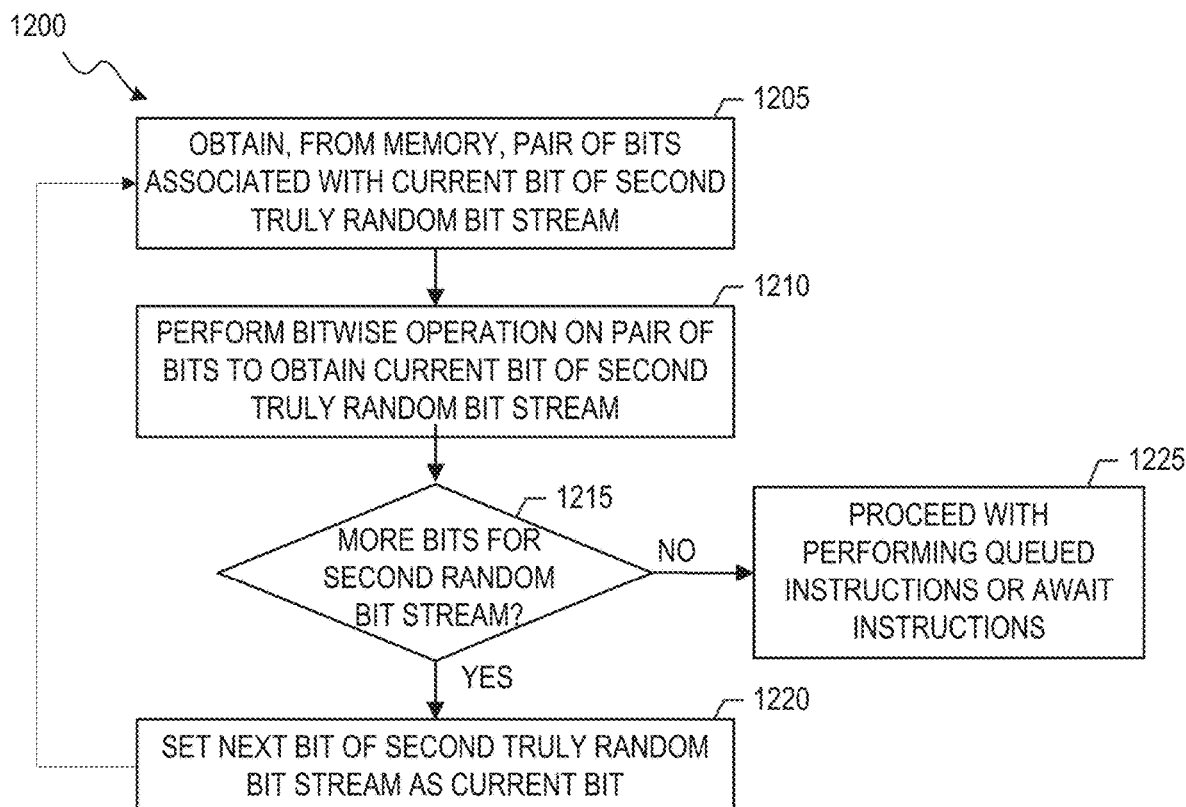

FIG. 12 illustrates a flow diagram of an example process 1200 for generating a truly random bit stream in accordance with one or more embodiments of the present disclosure. For explanatory purposes, the example process 1200 is described herein with reference to the system 700 of FIGS. 7A-7C; however, the example process 1200 is not limited to the example system 700 of FIGS. 7A-7C. For example, alternatively and/or in addition, the example process 1100 may be utilized with the example system 800 of FIGS. 8A-8C or the example system 900 in FIGS. 9A-9C. In an aspect, the example process 1200 may be implemented at block 1110 of the example process 1100 of FIG. 11. Note that one or more operations may be combined, omitted, and/or performed in a different order as desired.

At block 1205, the logic circuit 715 obtains (e.g., receives, retrieves), from the memory 705, a pair of bits to be associated with a current bit of the second truly random bit stream to be generated. At block 1210, the logic circuit 715 performs a bitwise operation on the pair of bits to obtain the current bit. In the example shown in FIG. 7A, the logic circuit 715 generates the current bit $b_{S4,0}$ based on the pair of bits $b_{S1,0}$ and $b_{S1,1}$ stored in the memory cells 710A and 710B, respectively. At block 1215, the logic circuit 715 determines whether more bits of the second truly random bit stream need to be generated. For example, the length of the bit streams to be generated by the system 700 may be based on a desired security level, which may change over time and/or based on human input. For example, a user may directly specify the desired length of the truly random bit streams and/or specify a desired security level to cause the logic circuit 715 to generate truly random bit streams of an appropriate length for the desired security level.

When the logic circuit 715 determines that more bits of the second truly random bit stream need to be generated, the process 1200 proceeds to block 1220. At block 1220, the logic circuit 715 sets a next bit $b_{S4,1}$ as the current bit and proceeds to block 1205 to facilitate generation of the bit $b_{S4,1}$. In an aspect, when the memory 705 is a shift register, the bits of the memory 705 may be shifted over by one bit at block 1220 in preparation for a next iteration. When the logic circuit 715 determines that no more bits of the second truly random bit stream need to be generated (e.g., the second truly random bit stream has been constructed to the specified length), the process 1200 proceeds to block 1225. At block 1225, the system 700 proceeds with performing queued instructions (e.g., generate a next truly random bit stream of a specified length) or awaiting for instructions when there are no queued instructions.

It is noted that the foregoing illustrates example ways to generate additional truly random bit streams based on truly random bits from one or more truly random bit generator sources (e.g., 305, 310) and/or derived from the truly random bits from the truly random bit generator source(s). In an embodiment, the random bits may be absolutely unbiased and true random bits. The truly random bits may be combined to generate more truly random bits. Other sampling of truly random bit streams and/or intermixing of truly random bit streams may be utilized to generate additional truly random bit streams. As such, in various embodiments, the rate of generation of truly random bits and associated truly random bit streams may increase by many factors (e.g., 2, 5, 10, 100, 1000, or higher factor) relative to a case in which the truly random bits and truly random bit streams are strictly generated by one or more truly random bit generator source(s). In some cases, the generated truly random bits may themselves be a random bit generator source or random number generator source such as truly random bit generator sources 305 and 310. In some cases, the generated truly random bits may be provided bit-by-bit (e.g., as each bit is generated) or in batches of bits (e.g., buffered after each bit is generated and then provided in batches).

In one or more embodiments, data may be encrypted and decrypted using key material (e.g., encrypted using encryption key and decrypted using corresponding decryption key). On the encryption side, an encryptor may receive plaintext data (e.g., user data) to be encrypted. On the decryptor side, a decryptor may receive the encrypted data to be decrypted (e.g., for storage and/or user consumption). In some aspects, the key material may be, or may be derived based on, one or more truly random bit streams generated by the truly random bit generator(s) (e.g., 305 and/or 310), such as through mechanisms described FIGS. 3-6, 7A-7C, 8A-8C, 9A-9D, and 10-12 for example. In some aspects, the key material need not be, or need not be based on, random bit streams or true random bit streams.

Figure 13:
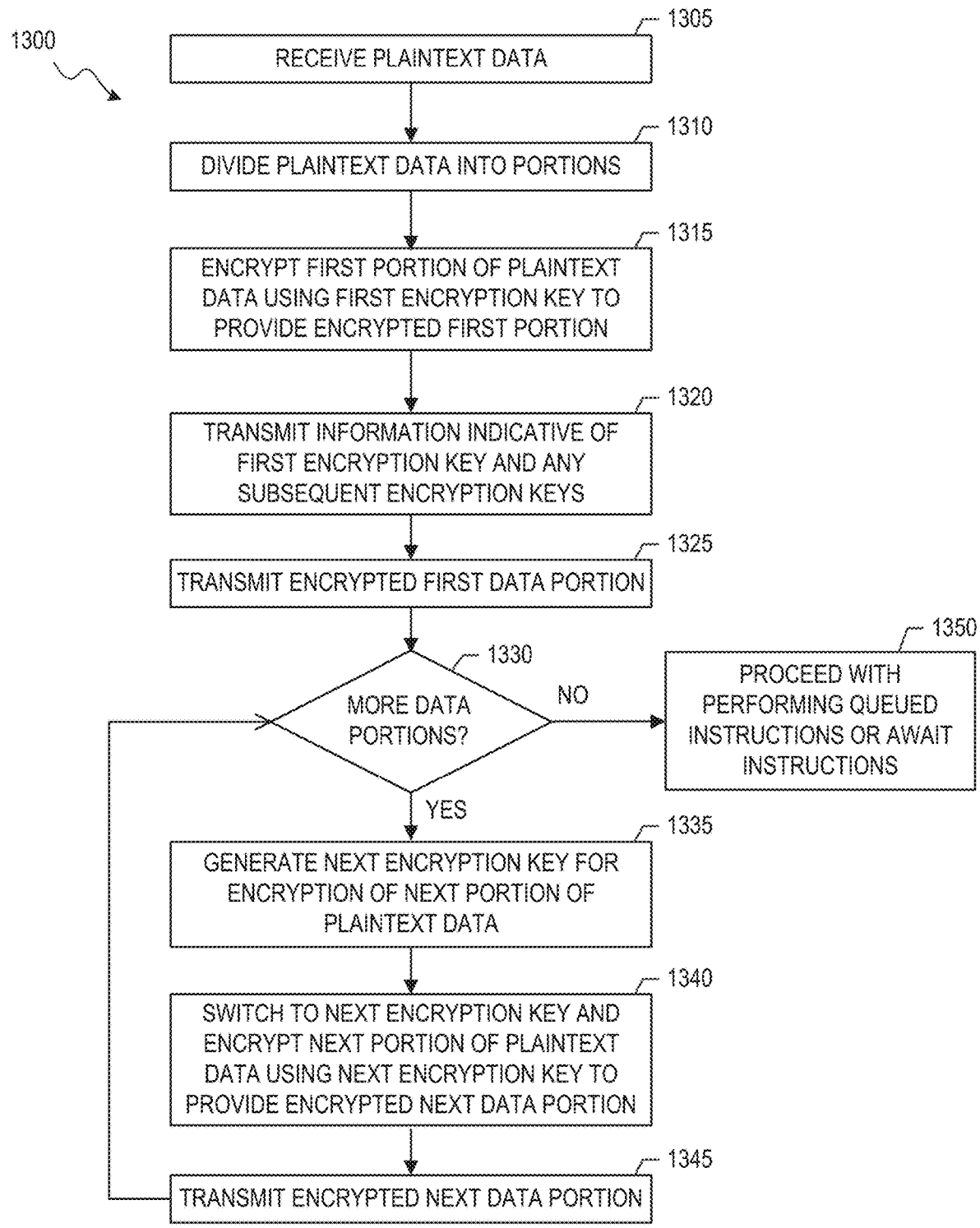
FIG. 13 illustrates a flow diagram of an example process for facilitating iterative encryption key generation and data encryption in accordance with one or more embodiments of the present disclosure.

FIG. 13 illustrates a flow diagram of an example process 1300 for facilitating iterative data encryption and encryption key generation in accordance with one or more embodiments of the present disclosure. For explanatory purposes, the example process 1300 is described herein with reference to the example network environment 100 of FIG. 1; however, the example process 1300 is not limited to the example network environment 100 of FIG. 1. In addition, for explanatory purposes, the computing device 105D is the encryptor and the computing device 105A is the decryptor. Note that one or more operations may be combined, omitted, and/or performed in a different order as desired.

At block 1305, the computing device 105D receives plaintext data to be encrypted. The plaintext data may be stored in a memory (e.g., the memory 225) of the computing device 105D. For example, the computing device 105D may be a server that hosts a website and the plaintext data includes web content. In this example, the computing device 105D may retrieve the plaintext data upon a request received from the computing device 105A for the associated web content. At block 1310, the computing device 105D divides (e.g., fragments, partitions) the plaintext data into one or more data portions to be encrypted. For example, the computing device 105D may divide the plaintext data into one or more data portions to facilitate encryption of the plaintext data and/or transmission of the encrypted data. The length (e.g., number of bits or bytes) of each data portion of the plaintext data may be the same or different. In some cases, the length (e.g., number of bits or bytes) of the data portion may be based on communication protocol used to transmit the data portion and/or the length of the encryption key to be used to encrypt the portion. In this regard, the length of the encryption key may be based on a desired security level (e.g., set by a user, mandated by an owner of a server, government authority, etc.).

At block 1315, the computing device 105D encrypts, using a logic circuit (e.g., also referred to as an encryption logic circuit), a first data portion of the plaintext data using a first encryption key to provide an encrypted first data portion. The first data portion of the plaintext data, first encryption key and encrypted first data portion may be stored (e.g., buffered) in a memory (e.g., the memory 225) of the computing device 105D. In some cases, the data portion of the plaintext data considered to be the first data portion may be selected arbitrarily by the computing device 105D. In an aspect, the computing device 105D may encrypt the first data portion by applying bitwise operations on the first data portion and the first encryption key. In one example, to obtain each bit of the encrypted data portion, the computing device 105D may perform an XOR operation on one bit of the first data portion and one corresponding bit of the first encryption key, although generally any bitwise operations such as an XNOR operation, AND operation, OR operation, other operation, or combination thereof may be used. In some cases, the first encryption key may be, or may be derived based on, one or more truly random bit streams from one or more truly random bit generator sources (e.g., 305 and/or 310 of FIG. 3). In other cases, the first encryption key is not, or is not based on, a truly random bit stream.

At block 1320, the computing device 105D transmits information indicative of the first encryption key used for encryption of the first data portion and information indicative of any subsequent encryption keys. Such information may indicate to the computing device 105A (e.g., the decryptor in this example) how to generate a first decryption key (e.g., corresponding to the first encryption key) and any subsequent decryption keys (e.g., corresponding to subsequent encryption keys). In some cases, the information indicative of the first encryption key and subsequent encryption keys (if any) may be provided as part of a key exchange between the computing devices 105A and 105D. The information may be stored in a memory (e.g., the memory 225) of the computing device 105D.

At block 1325, the computing device 105D transmits the first encrypted data portion to the computing device 105A (e.g., via the connections 115D and 115A and the network 110). In some cases, the computing device 105D transmits the first encrypted data portion in a data packet (e.g., as a payload of the data packet). In some cases, the data packet may include a header that identifies the length of the first encrypted data portion, information indicative of where the first data portion fits within the entirety of the plaintext data (e.g., to facilitate reassembly of the data portions by the decryptor), and/or other information associated with the first data portion and/or encryption thereof.

At block 1330, the computing device 105D determines whether there are more data portions in the plaintext data received at block 1305 to be encrypted. When there are more data portions to be encrypted, the process 1300 proceeds to block 1335. At block 1335, the computing device 105D generates a second encryption key for encryption of a second data portion of the plaintext data based on the first encryption key and at least one of the encrypted first data portion or the plaintext first data portion. In this regard, the second encryption key may be generated based on the first encryption key and the first encrypted data portion, the first encryption key and the first plaintext data portion, or the first encryption key and a combination of the first encrypted data portion and first plaintext data portion.

In an aspect, the first plaintext data portion and first encrypted data portion may have the same length. The first encryption key may have a length that is at least the length of the first plaintext data portion. As one example, the second encryption key may be generated by performing a bitwise operation on the first encryption key and a scrambled version of the first plaintext data portion. In this example, the scrambled version of the first plaintext data portion may include flipping the first plaintext data portion such that a first bit of the first plaintext data portion is a last bit of the scrambled first plaintext data portion, and vice versa, and so forth for intervening bits. The information indicating how the second encryption key is generated may be transmitted to the computing device 105A at block 1320. The information may identify the bitwise operations, scrambling, and/or parts of the plaintext and/or first encrypted data portion (or combination thereof) used to generate the second encryption key.

At block 1340, the computing device 105D switches from the first encryption key to the second encryption key and encrypts the second portion of the plaintext data using the second encryption key. At block 1345, the computing device 105D transmits the second encrypted data portion to the computing device 105A. The process 1300 then proceeds to block 1330, in which the computing device 105D determines whether the plaintext data has a third data portion to be encrypted using a third encryption key, where the third encryption key (e.g., when the third data portion is present) is generated based on the second encryption key and at least one of the second encrypted data portion or the second plaintext data portion.

Blocks 1330, 1335, 1340, and 1345 may be iteratively performed until all portions of the plaintext data to be encrypted have been encrypted. For example, in an $n^{th}$ iteration, an $n^{th}$ encryption key for encrypting an $n^{th}$ portion of the plaintext data may be generated based on an $(n-1)^{th}$ encryption key and at least one of the $(n-1)^{th}$ data portion or the encrypted $(n-1)^{th}$ data portion (e.g., $(n-1)^{th}$ data portion encrypted using the $(n-1)^{th}$ encryption key). When the computing device 105D determines, at block 1330, that there are no more data portions to be encrypted, the process 1300 proceeds to block 1350. At block 1350, the computing device 105D proceeds with existing instructions or awaits new instructions. When the computing device 105D determines that there are no more data portions of the plaintext data to be encrypted, the process 1300 process to block 1350. At block 1350, the computing device 105D proceeds with performing queued instructions (e.g., encrypt a next plaintext data) or awaiting for instructions when there are no queued instructions.

Figure 14:
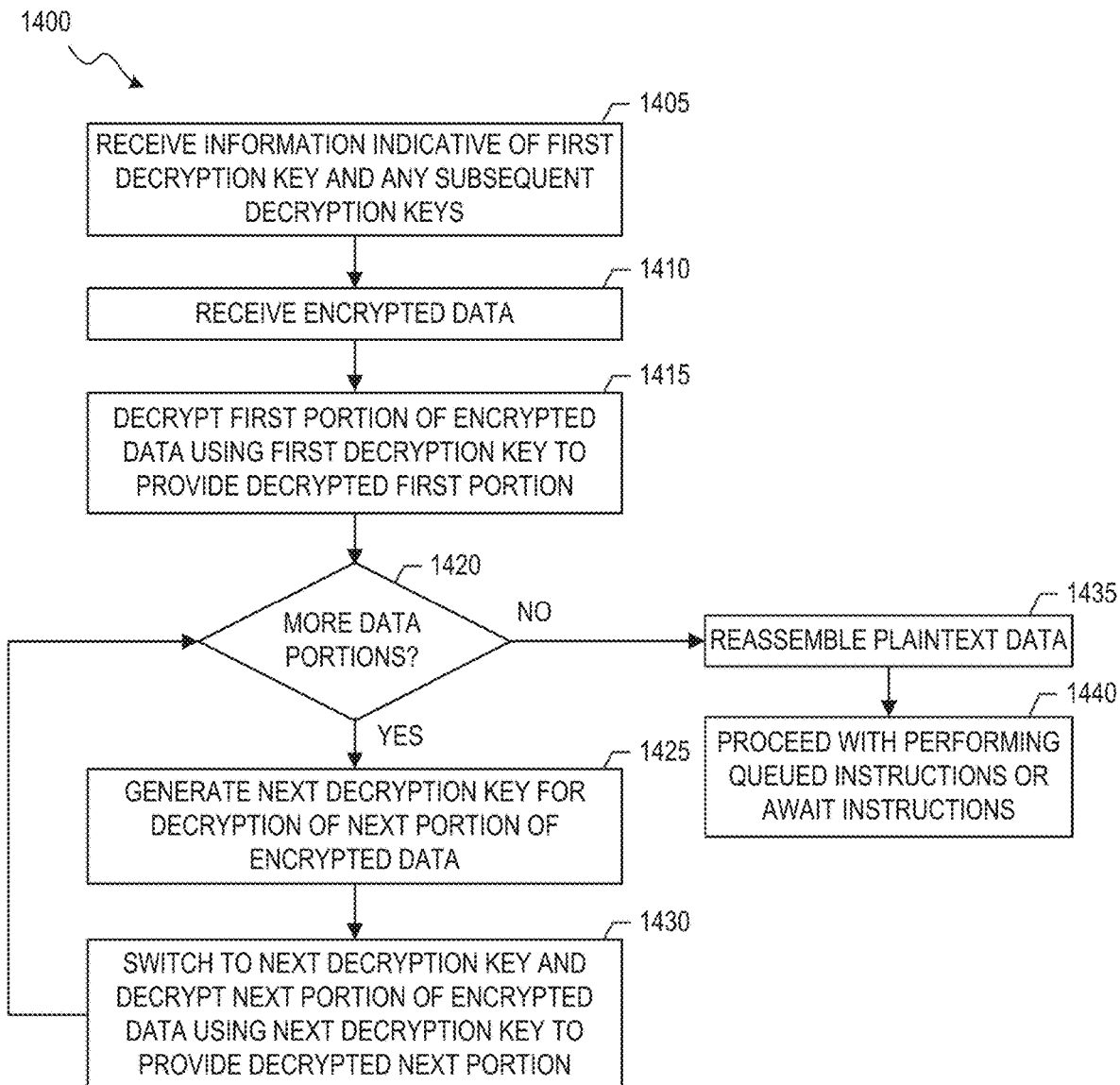
FIG. 14 illustrates a flow diagram of an example process for facilitating iterative decryption key generation and data decryption in accordance with one or more embodiments of the present disclosure.

FIG. 14 illustrates a flow diagram of an example process 1400 for facilitating data decryption and decryption key generation in accordance with one or more embodiments of the present disclosure. For explanatory purposes, the example process 1400 is described herein with reference to the example network environment 100 of FIG. 1; however, the example process 1400 is not limited to the example network environment 100 of FIG. 1. Note that one or more operations may be combined, omitted, and/or performed in a different order as desired. In an embodiment, the process 1400 may be performed by the computing device 105A in response to receiving encrypted data from the computing device 105D. For example, the computing device 105D may provide the encrypted data to the computing device 105A by performing the process 1400 of FIG. 14.

At 1405, the computing device 105A receives information indicative of a first decryption key and any subsequent decryption keys. In some cases, the information may identify the first encryption key and the bitwise operations, scrambling, and/or parts of the plaintext data portions and/or encrypted data portions (or combination thereof) used by the computing device 105D to generate subsequent encryption keys. The computing device 105A may determine, or determine how to generate, the first decryption key and any subsequent decryption keys based on such information from the computing device 105D. The information may be stored in a memory (e.g., the memory 225) of the computing device 105A.

At block 1410, the computing device 105A receives encrypted data. At block 1415, the computing device 105A decrypts a first encrypted data portion using the first decryption key. In an aspect, each encrypted data portion may be part of a data packet that has a header with information on where the encrypted data portion fits in the plaintext data. The computing device 105A may identify the first encrypted data portion based on such header information. At block 1420, the computing device 105A determines whether there are more encrypted data portions to be decrypted. When there are more encrypted data portions to be decrypted, the process 1400 proceeds to block 1425. The encrypted data (or portion thereof), first decryption key, and first decrypted data portion may be stored (e.g., buffered) in a memory (e.g., the memory 225) of the computing device 105A. At block 1425, the computing device 105A generates a second decryption key for decryption of a second data portion of the encrypted data based on the first encryption key and at least one of the decrypted first data portion or the encrypted first data portion. In this regard, the computing device 105A may generate the second decryption key based on the information received at block 1405 from the computing device 105D. In this regard, such information may indicate whether the computing device 105A is to generate the second decryption key based on the first decryption key and the first decrypted data portion, the first encryption key and the first data portion, or the first decryption key and a combination of the first decrypted data portion and first encrypted data portion. For example, the information may specify the operations (e.g., bitwise operations) and/or other processing (e.g., data scrambling/descrambling) to be performed by the computing device 105A to generate the second decryption key and decrypt the second encrypted portion using the second decryption key.

At block 1430, the computing device 105A decrypts the second data portion of the encrypted data using the second decryption key. The process 1400 then proceeds to block 1430, in which the computing device 105A determines whether the encrypted data has a third portion to be decrypted using a third decryption key. The computing device 105A may generate the third decryption key in accordance with the information received at block 1405. The third decryption key may be generated based on the second decryption key and at least one of the second decrypted data portion or the second encrypted data portion. Blocks 1420, 1425, and 1430 may be iteratively performed until all portions of the encrypted data have been decrypted. For example, in an $n^{th}$ iteration, an $n^{th}$ decryption key for decrypting an $n^{th}$ portion of the encrypted data may be generated based on an $(n-1)^{th}$ decryption key and at least one of the encrypted $(n-1)^{th}$ data portion or the decrypted $(n-1)^{th}$ portion (e.g., encrypted $(n-1)^{th}$ data portion decrypted using the $(n-1)^{th}$ decryption key).

When the computing device 105A determines that there are no more data portions to be decrypted, the process 1400 proceeds to block 1435. At block 1435, the computing device 105A reassembles plaintext data using the decrypted data portions. Once the encrypted data has been decrypted and reassembled, the decrypted data may be stored and/or used. For example, the decrypted data may be web page content to be provided for display to the user in a web browser application running on the computing device 105A. At block 1440, the computing device 105A proceeds with performing queued instructions (e.g., decrypt a next encrypted data) or awaiting for instructions when there are no queued instructions.

In an embodiment, the process 1300 may be performed for each plaintext data to be encrypted (e.g., and sent to another computing device) by the computing device 105D (and/or any other encryptor). Similarly, the process 1400 may be performed for each encrypted data to be decrypted by the computing device 105A (and/or any other decryptor). In this regard, using different key material for different data and data portions enhances security. For example, even in a case that a decryption key is stored by the decryptor and an attacker is able to retrieve the decryption key, the attacker may use the decryption key to decrypt only one of the encrypted data portions, since other encrypted data portions are associated with different decryption keys.

In one or more embodiments, the key material and/or associated data may be erased after use. On the encryption side, the key material may be an encryption key and the associated information may be the data (or data portion) that is encrypted using the encryption key. On the decryption side, the key material may be a decryption key and the associated data may be the encrypted data (or encrypted data portion) that is decrypted using the decryption key. In an aspect, the key material may be, and/or may be derived from, one or more truly random bit streams generated by one or more random number generators (e.g., 305 and/or 310). In another aspect, the key material is not, or is not derived from, a truly random bit stream. The erasing of the key and/or associated data may shorten the duration of time that the key and/or associated data remain stored in memory, thus enhancing security at least by reducing the amount of time available for an attacker to obtain such information.

Figure 15:
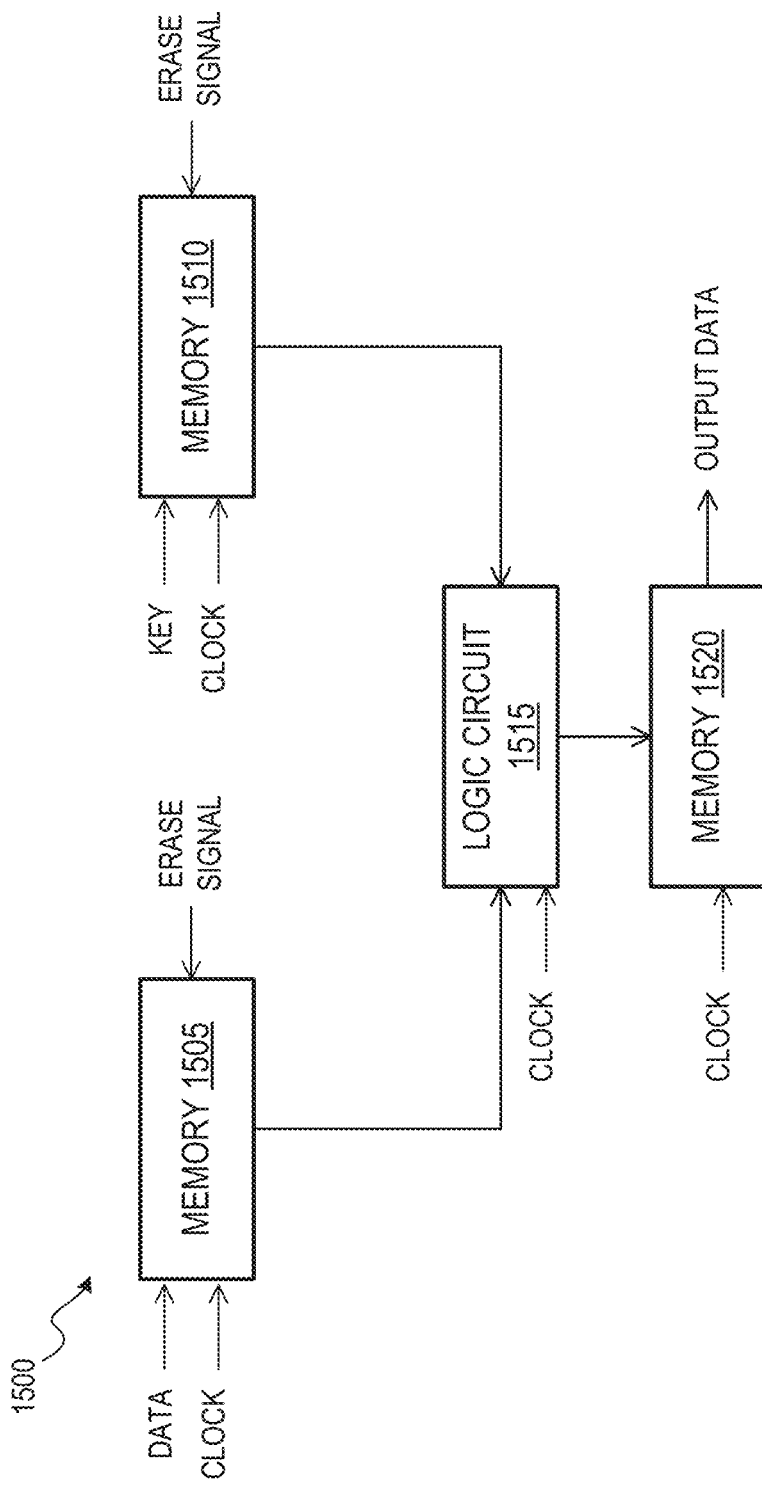
FIGS. 15 through 17 illustrate a block diagram of systems for facilitating encryption/decryption and erasing of associated information in accordance with one or more embodiments of the present disclosure.

FIG. 15 illustrates a block diagram of a system 1500 for facilitating encryption/decryption and erasing of associated information in accordance with one or more embodiments of the present disclosure. The system 1500 includes memories 1505, 1510, and 1520, and logic circuit 1515. The memories 1505, 1510, and 1520, and logic circuit 1515 may receive clock signals from a clock circuit (e.g., 345 in FIG. 3) for facilitating the encryption and/or the decryption. In an embodiment, the system 1500 may be implemented in any one of the computing devices 105A-D.

The system 1500 may be utilized for encryption and/or decryption. In one case, when the system 1500 is, or is utilized as, an encryption system, the memory 1505 may receive and store plaintext data to be encrypted, the memory 1510 may receive and store an encryption key to encrypt the plaintext data stored in the memory 1505, the logic circuit 1515 may encrypt the plaintext data stored in the memory 1505 using the encryption key stored in the memory 1510 to provide encrypted data, and the memory 1520 may receive, store, and facilitate transmission of the encrypted data. The logic circuit 1515 may encrypt the plaintext data by performing bitwise operations on the plaintext data and the encryption key (e.g., in a manner specified during key exchange). For example, the plaintext data may be, may include, or may be a part of, the plaintext data received at block 1305 of FIG. 13. For example, the data received in the memory 1505 may be one of the portions obtained at block 1310 of FIG. 13. In an aspect, the encryption key may be received in the memory 1510 from a truly random bit generator source (e.g., 305, 310) or derived from one or more truly random bit streams generated by one or more truly random bit generator sources. In an aspect, the encryption key is not, or is not derived from, a truly random bit stream.

In another case, when the system 1500 is, or is utilized as, a decryption system, the memory 1505 may receive encrypted data (e.g., from an encryptor) to be decrypted and store the encrypted data, the memory 1510 may receive and store a decryption key to decrypt the encrypted data stored in the memory 1505, the logic circuit 1515 may decrypt the encrypted data stored in the memory 1505 using the decryption key stored in the memory 1510 to provide decrypted data, and the memory 1520 may receive, store, and facilitate use of the decrypted plaintext data (e.g., by providing the decrypted data for display to a user). The logic circuit 1515 may decrypt the encrypted data by performing bitwise operations on the encrypted data and the decryption key (e.g., in a manner specified during key exchange).

In an embodiment, for both encryption and decryption systems, the memories 1505 and/or 1510 may be configured to receive an erase signal (e.g., also referred to as an overwrite signal or erase/overwrite signal) that, when enabled (e.g., set to a logic high), causes the memories 1505 and/or 1510 to erase contents of the memories 1505 and/or 1510. For example, in some cases, the memory 1510 may receive the erase signal that, when enabled, causes the memory 1510 to erase the key stored in the memory 1510. In some aspects, the erase signal is enabled nearly simultaneously with an output being generated at the logic circuit 1515, where the output is encrypted data for an encryption system or decrypted data for a decryption system. In FIG. 15, both of the memories 1505 and 1510 can receive an erase signal, which may be in the same or different states (e.g., logic high, logic low) for the memories 1505 and 1510. In other cases, one of the memories 1505 or 1510 is configured to receive an erase signal. In various embodiments, utilization of the erase signal for one or both of the memories 1505 and 1510 enhances security at least by shortening an amount of time that the key (e.g., encryption key or decryption key) and/or the data (e.g., encrypted data or plaintext data) is stored.

In one aspect, the erase signal may be a predetermined value (e.g., 0 or 1) or predetermined sequence of values that is provided to (e.g., stored in) memory cells of the memories 1505 and/or 1510 to overwrite content stored in the memory cells. For example, a permanent 1 (or 0) line may be provided to the memory 1510 to overwrite the key contained in the memory 1510 with value 1 (or 0). As another example, a predetermined sequence of values (e.g., sequence of 0s and 1s) may be provided to the memory cells of the memory 1510 to cause the overwrite. In another aspect, the erase signal may be, or may be based on, an output of the logic circuit 1515. As one example, the output of the logic circuit 1515 may be fed into the memories 1505 and/or 1510 to overwrite the content (e.g., key, data) contained in the memories 1505 and/or 1510. When both the memories 1505 and 1510 have an erase signal, their erase signals may be the same, or may be different. In an embodiment, the memories 1505 and 1510 may be shift registers with no serial outshift capability or with their serial outshift capability disabled, to prevent the key and/or associated data from being provided out of the memories 1505 and/or 1510 via the serial shift out path.

Figure 16:
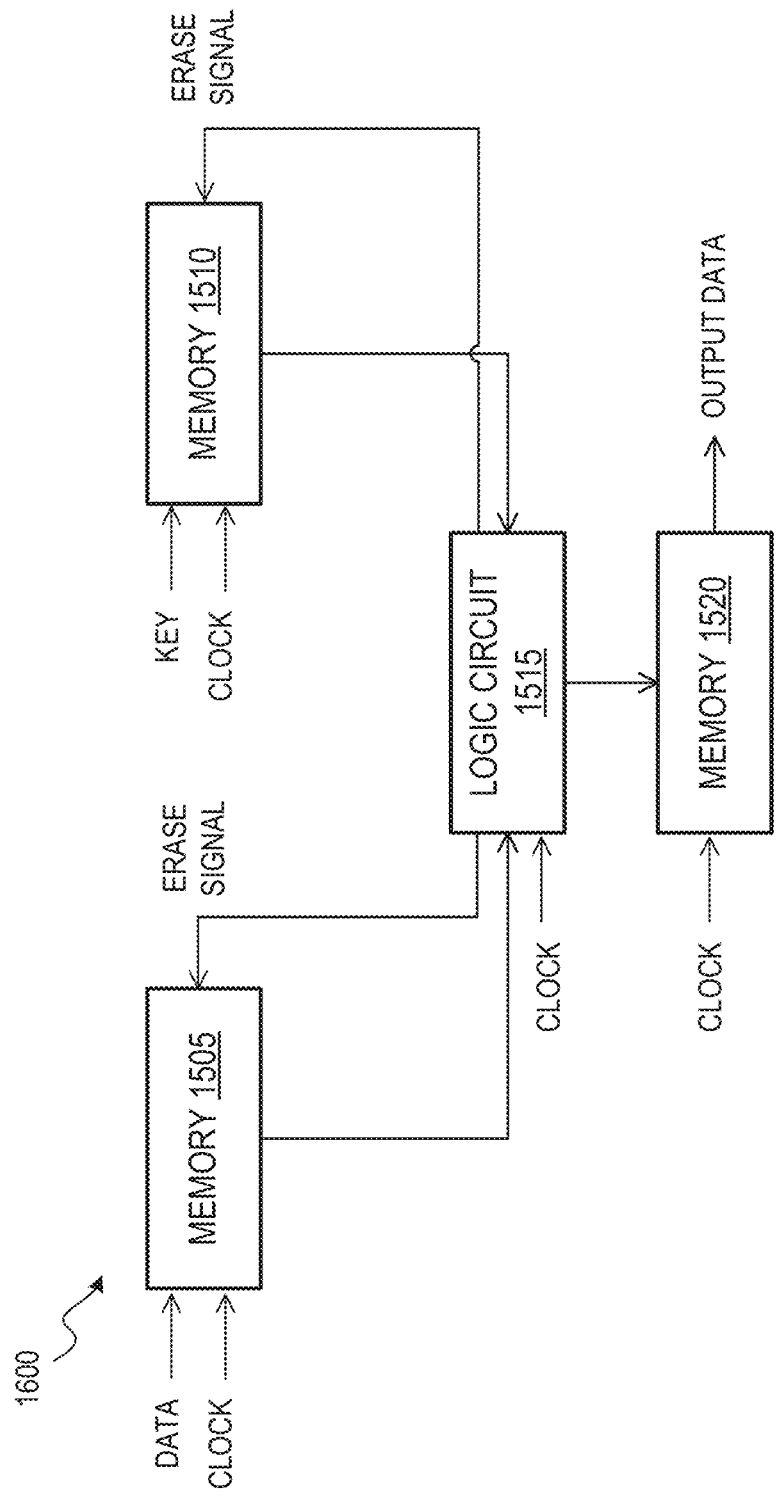

FIG. 16 illustrates a block diagram of a system 1600 for facilitating encryption/decryption and erasing of associated information in accordance with one or more embodiments of the present disclosure. In an embodiment, the system 1600 may be, may include, or may be a part of, the system 1500 of FIG. 15. The description of FIG. 15 generally applies to FIG. 16. In FIG. 16, the logic circuit 1515 provides an erase signal to the memories 1505 and 1510.

Figure 17:
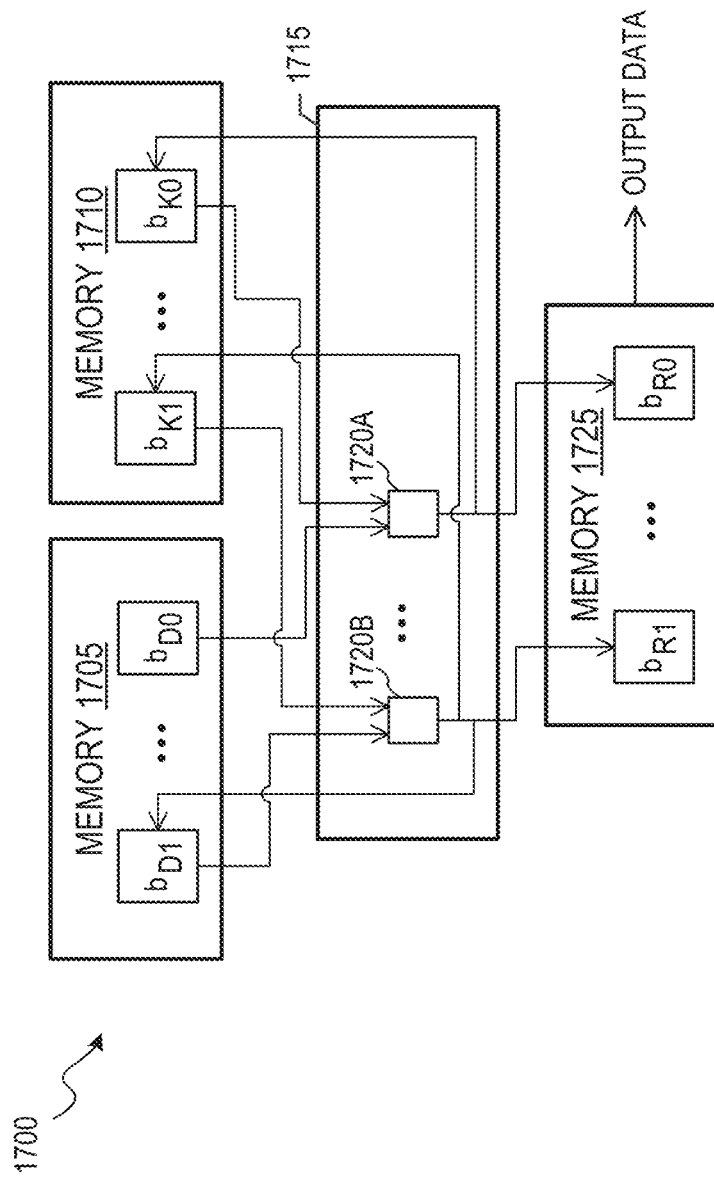

FIG. 17 illustrates a block diagram of a system 1700 for facilitating encryption/decryption and erasing of associated information in accordance with one or more embodiments of the present disclosure. In an embodiment, the system 1700 may be, may include, or may be a part of, the system 1500 of FIG. 15 or the system 1600 of FIG. 16. The memories 1705, 1710, and 1725 may be, may include, or may be a part of, the memories 1505, 1510, and 1520, respectively, of FIGS. 15 and 16. The logic circuit 1715 may be, may include, or may be a part of, the logic circuit 1515. In FIG. 17, the logic circuit 1715 includes combiners 1720A and 1720B. The ellipses in the memories 1705, 1710, and 1725 may represent one or more additional memory cells, and the ellipses in the logic circuit 1715 may represent one or more additional combiners.

For an encryptor, the combiner 1720A may receive a plaintext data bit $b_{D0}$ and an encryption key bit $b_{K0}$ from the memories 1705 and 1710, respectively, and combine them to generate an encrypted data bit $b_{R0}$ to provide to the memory 1725 (e.g., for buffering). The combiner 1720B may receive a plaintext data bit $b_{D1}$ and an encryption key bit $b_{K1}$ from the memories 1705 and 1710, respectively, and combine them to generate an encrypted data bit $b_{R1}$ to provide to the memory 1725.

Similarly, for a decryptor, the combiner 1720A may receive an encrypted data bit $b_{D1}$ and a decryption key bit $b_{K1}$ from the memories 1705 and 1710, respectively, and combine them to generate a decrypted data bit $b_{R0}$ to provide to the memory 1725 (e.g., for buffering). The combiner 1720B may receive an encrypted data bit $b_{D1}$ and a decryption key bit $b_{K1}$ from the memories 1705 and 1710, respectively, and combine them to generate a decrypted data bit $b_{R1}$ to provide to the memory 1725. In some cases, the combiners 1720A and 1720B may perform a bitwise operation, such as an XOR, XNOR, AND, or OR operation, or other operation. The bitwise operation performed by the combiners 1720A and 1720B may be the same or may be different.

As shown in FIG. 17, an output of the combiner 1720A (e.g., the bit $b_{R0}$) and the combiner 1720B (e.g., the bit $b_{R1}$) are fed back into the memories 1705 and 1710. In this manner, the key and associated data are overwritten after an output from the combiners 1720A and 1720B is generated. In an aspect, the overwriting of the key and associated data occurs soon after the output from the combiners 1720A and 1720B have been generated, thus shortening the amount of time that the key and/or associated data are stored in the memories 1710 and 1705 and preventing reuse of the key and associated data. In some cases, rather than directly feeding outputs of the combiners 1720A and 1720B to the memories 1705 and 1710, the logic circuit 1715 may process (e.g., scramble, invert bits, etc.) the outputs and provide the processed outputs to the memories 1705 and 1710. These processed outputs may be referred to as being information associated with (e.g., indicative of) the outputs themselves or a form of the outputs.

Figure 18:
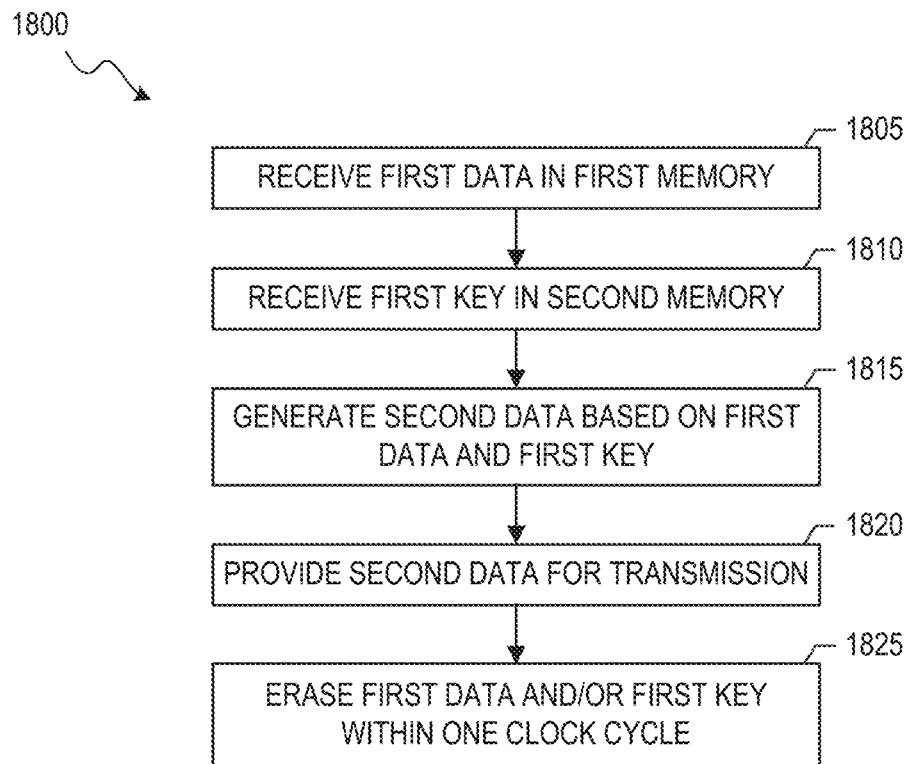
FIG. 18 illustrates a flow diagram of an example process for facilitating encryption/decryption and erasing of associated information in accordance with one or more embodiments of the present disclosure.

FIG. 18 illustrates a flow diagram of an example process 1800 for facilitating encryption/decryption and erasing of associated information in accordance with one or more embodiments of the present disclosure. For explanatory purposes, the example process 1800 is described herein with reference to the example system 1500 of FIG. 15; however, the example process 1800 is not limited to the example system 1500 of FIG. 15. Note that one or more operations may be combined, omitted, and/or performed in a different order as desired. In an embodiment, the process 1800 may be an encryption process or a decryption process. As an example, the system 1500 may be provided in the computing device 105A.

At block 1805, first data is received in the memory 1505. At block 1810, a key is received in the memory 1510. At block 1815, the logic circuit 1515 generates second data based on the first data and the key. For an encryption process, the first data received in the memory 1505 may be plaintext data (or portion thereof), the key received in the memory 1510 may be an encryption key, and the second data may be encrypted data. For a decryption process, the first data received in the memory 1505 may be encrypted data (or portion thereof), the key received in the memory 1510 may be a decryption key, and the second data may be decrypted data. At block 1820, the logic circuit 1515 provides the second data for transmission. For example, the logic circuit 1515 may provide the data for storage in the memory 1520 (e.g., used as a buffer) where the data may be transmitted by the memory 1520 or retrieved from the memory 1520 (e.g., for subsequent transmission and/or consumption).

At block 1825, the key and/or first data is erased. In some cases, a predetermined value or sequence of values may be provided to the memories 1505 and/or 1510 to overwrite the first data and/or key, respectively, stored therein. In some cases, the logic circuit 1515 may overwrite the memories 1505 and/or 1510 using the second data or a sequence of bits generated based on the second data. In an embodiment, the process 1800 may be repeated for each portion of data to be encrypted or decrypted. Different keys may be generated for different portions of the data. In an aspect, the different keys may be generated in a manner similar to that described with respect to processes 1300 and 1400 of FIGS. 13 and 14, respectively.

Figure 19:
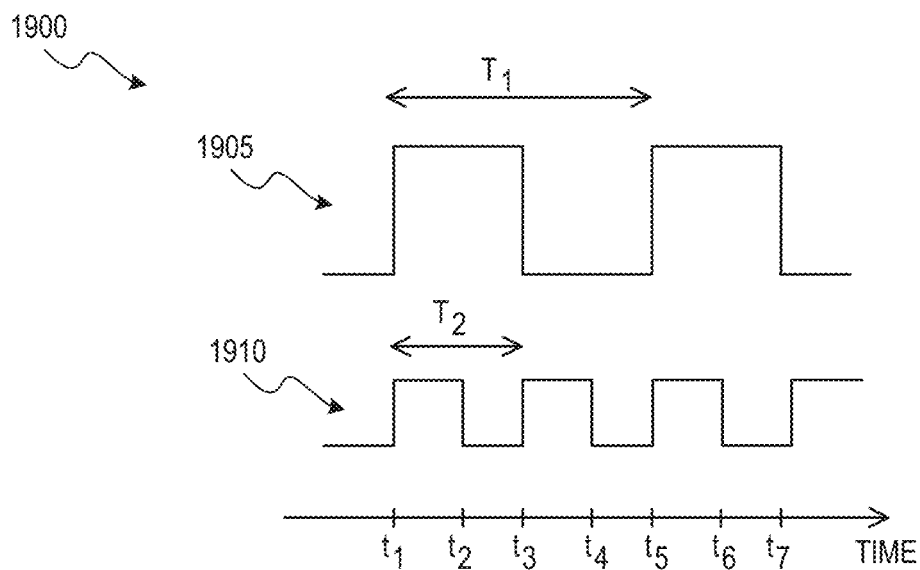
FIG. 19 illustrates a timing diagram and associated clock signals for facilitating encryption/decryption and erasing of associated information in accordance with one or more embodiments of the present disclosure.

FIG. 19 illustrates a timing diagram 1900 and associated clock signals for facilitating encryption/decryption and erasing of associated information in accordance with one or more embodiments of the present disclosure. For explanatory purposes, the timing diagram 1900 is described herein with reference to the example system 1500 of FIG. 15 and the example process 1800 of FIG. 18; however, the timing diagram 1900 is not limited to the example system 1500 of FIG. 15 and the example process 1800 of FIG. 18.

The timing diagram 1900 includes clock signals 1905 and 1910. The clock signal 1910 has a period $T_2$ that is half the duration of a period $T_1$ of the clock signal 1905. The clock signals 1905 and/or 1910 may be generated by a clock circuit, such as the clock circuit 345 of FIG. 3. In some cases, the clock circuit may apply a clock frequency multiplier to the clock signal 1905 to generate the clock signal 1910. In some cases, the clock signal 1905 may be utilized to facilitate operation of the memories 1505 and 1510 and logic circuit 1515, and the clock signal 1910 may be utilized to facilitate operation of the memory 1520.

At a time $t_1$, the memories 1505 and 1510 may be prepared to receive data (e.g., encrypted data, plaintext data) and key material (e.g., decryption key, encryption key), respectively. At a time $t_2$, the memory 1520 may be prepared to receive an output of the logic circuit 1515. For example, the memories 1505, 1510, and 1520 may be formed of transistors whose gates need to be properly biased or otherwise prepared in order to receive and store incoming information. Between the time $t_1$ and $t_2$, the data and key material may be provided in (e.g., shifted into) the memories 1505 and 1510, respectively.

At a time $t_3$, the logic circuit 1515 may generate an output based on the data and the key material, and the memory 1520 may receive the output from the logic circuit 1515. For example, the logic circuit 1515 may generate an output by performing bitwise operations (e.g., XOR operations on the data and the key material. At a time $t_4$, the memory 1520 may store the output received from the logic circuit 1515, and the memories 1505 and/or 1510 may receive an erase signal that overwrites the memories 1505 and/or 1510. The erasing of the memories 1505 and/or 1510 may occur within a duration of one clock cycle of the period $T_1$. In this regard, the erasing may occur within the same clock cycle as that of the output from the logic circuit 1515 being received by the memory 1520. As shown in FIG. 19, the erasing may occur in one-half clock cycle (e.g., in a duration $0.5T_1$ or equivalently in a duration $T_2$) of generating the output based on the data and the key material at the time $t_3$. At a time $t_5$, the memories 1505 and 1510 may be prepared to receive data and key material, respectively, and the memory 1520 may output the stored data. In this regard, the erasing of the memories 1505 and/or 1510 has occurred prior to the memories 1505 and 1510 being prepared to receive the data and key material, respectively. At a time $t_6$, the memory 1520 may be prepared to receive an output of the logic circuit 1515. This iterative process may repeat for each received data (e.g., each received data portion). Operation of the system 1500 based on the clock signals 1905 and 1910 may facilitate encryption/decryption and erasing of associated information, such that the logic circuit 1515 receives the data and the key from the memories 1505 and 1510 prior to the data and/or key being erased. By having the data and/or associated key erased within one clock cycle, such erasing helps prevent an attacker from getting to data once the data is encrypted (or decrypted) or the key once the key is used for encryption (or decryption).

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A method comprising:
  receiving in a first memory a first truly random bit stream, wherein the first truly random bit stream is generated based on quantum mechanical processes;
  receiving in a second memory a second truly random bit stream;
  generating, by a logic circuit, a third truly random bit stream by performing bitwise operations to combine each bit of the first truly random bit stream with a corresponding bit of the second truly random bit stream;
  storing the third truly random bit stream in a third memory;
  retrieving one bit of a pair of bits of the first truly random bit stream from a first memory cell of the first memory and another bit of the pair of bits of the first truly random bit stream from a second memory cell of the first memory;
  generating, by the logic circuit, a bit of a fourth truly random bit stream based on the pair of bits from the retrieving.

2. The method of claim 1, wherein the bitwise operations have logical equality.

3. The method of claim 1, further comprising transmitting the third truly random bit stream to a processing circuit to cause generation of an encryption key based on the third truly random bit stream.

4. The method of claim 1, wherein the first truly random bit stream is generated based on quantum mechanically coupled photon states from a laser.

5. The method of claim 1, further comprising for each remaining bit of the fourth truly random bit stream:
  retrieving one bit of a respective pair of bits from a first respective memory cell of the first memory and another bit of the respective pair of bits from a second respective memory cell of the first memory; and
  generating a respective bit of the fourth truly random bit stream based on the respective pair of bits.

6. A method comprising:
  receiving a first truly random bit stream in a first memory comprising a plurality of memory cells, wherein each of the plurality of memory cells stores a respective one bit of the first truly random bit stream, wherein the first truly random bit stream is generated based on quantum mechanical processes;
  retrieving one bit of a pair of bits of the first truly random bit stream from a first memory cell of the plurality of memory cells and another bit of the pair of bits of the first truly random bit stream from a second memory cell of the plurality of memory cells;
  generating, by a logic circuit, a bit of a second truly random bit stream based on the pair of bits from the retrieving; and
  storing the bit of the second truly random bit stream in a second memory.

7. The method of claim 6, wherein the generating comprises:
  performing a bitwise operation on the pair of bits to obtain the current bit of the second truly random bit stream, wherein the bitwise operation has logical equality.

8. The method of claim 6,
  further comprising providing, subsequent to the retrieving of the pair of bits associated with the bit, one bit of a pair of bits associated with a next bit of the second truly random bit stream into the first memory cell and another bit of the pair of bits associated with the next bit in the second memory cell.

9. The method of claim 8, wherein the first memory comprises a shift register, wherein the providing comprises:

shifting, from the second memory cell into the first memory cell, the one bit of the pair of bits associated with the next bit; and shifting, from a third memory cell of the plurality of memory cells into the second memory cell, the another bit of the pair of bits associated with the next bit.

10. The method of claim 8, wherein the first memory comprises a shift register, wherein the providing comprises:

shifting, from a third memory cell of the plurality of memory cells into the first memory cell, the one bit of the pair of bits associated with the next bit; and shifting, from a fourth memory cell of the plurality of memory cells into the second memory cell, the another bit of the pair of bits associated with the next bit.

11. The method of claim 8, wherein the providing comprises:

shifting out a bit of the first truly random bit stream stored in a last memory cell of the plurality of memory cells; and shifting over each remaining bit of the first truly random bit stream.

12. The method of claim 11, wherein the last memory cell is the first memory cell of the plurality of memory cells.

13. The method of claim 6, further comprising generating, by the logic circuit, each bit of a third truly random bit stream based on the first truly random bit stream by:

retrieving one bit of the pair of bits associated with a bit of the third truly random bit stream from the first memory cell and another bit of the pair of bits associated with the bit of the third truly random bit stream from a third memory cell of the plurality of memory cells;

performing a bitwise operation on the pair of bits associated with the bit of the third truly random bit stream to obtain the bit of the third truly random bit stream; and repeating the retrieving and performing for each remaining bit of the third truly random bit stream.

14. The method of claim 6, further comprising:

generating, by the logic circuit, each bit of a third truly random bit stream based on a respective pair of bits of the second truly random bit stream;

storing the third truly random bit stream in a third memory;

generating a plurality of additional truly random bit streams; and sampling one or more bits from each of the plurality of additional truly random bit streams to form at least a portion of a fourth truly random bit stream.

15. The method of claim 14, further comprising generating, by the logic circuit, each bit of a fourth truly random bit stream based on bitwise operations on the second and third truly random bit streams, wherein the second truly random bit stream is stored in a shift register, and wherein the first and second truly random bit streams have a predetermined length.

16. The method of claim 6, further comprising for each remaining bit of the second truly random bit stream:

retrieving one bit of a respective pair of bits from a first respective memory cell of the plurality of memory cells and another bit of the respective pair of bits from a second respective memory cell of the plurality of memory cells; and generating a respective bit of the second truly random bit stream based on the respective pair of bits.

17. A device comprising:

a memory comprising a plurality of memory cells, wherein each of the plurality of memory cells is configured to store a respective one bit of a first truly random bit stream, and wherein the first truly random bit stream is generated based on quantum mechanical processes; and a logic circuit configured to retrieve one bit of a pair of bits of the first truly random bit stream from a first memory cell of the plurality of memory cells and another bit of the pair of bits of the first truly random bit stream from a second memory cell of the plurality of memory cells; and generate a bit of a second truly random bit stream based on the pair of bits from the retrieving.

18. The device of claim 17, wherein the logic circuit is configured to generate the bit of the second truly random bit stream by:

performing a bitwise operation on the pair of bits to obtain the current bit of the second truly random bit stream.

19. The device of claim 18, wherein the memory comprises a shift register configured to:

store, in the first memory cell, one bit of the pair of bits associated with the bit of the second truly random bit stream;

store, in the second memory cell, another bit of the pair of bits associated with the bit of the second truly random bit stream; and subsequent to obtaining the bit of the second truly random bit stream:

shift, into the first memory cell, one bit of a pair of bits associated with a next bit of the second truly random bit stream; and shift, into the second memory cell, another bit of the pair of bits associated with the next bit.

20. The device of claim 17, wherein the logic circuit is further configured to, for each remaining bit of the second truly random bit stream:

retrieve one bit of a respective pair of bits from a first respective memory cell of the plurality of memory cells and another bit of the respective pair of bits from a second respective memory cell of the plurality of memory cells; and generate a respective bit of the second truly random bit stream based on the respective pair of bits.

* * * * *